(12) United States Patent
Takada

(10) Patent No.: US 9,083,975 B2
(45) Date of Patent: Jul. 14, 2015

(54) MOVING IMAGE CODING DEVICE

(75) Inventor: Jun Takada, Tokyo (JP)

(73) Assignee: NEC CORPORATION, Tokyo (JP)

( * ) Notice: Subject to any disclaimer, the term of this patent is extended or adjusted under 35 U.S.C. 154(b) by 748 days.

(21) Appl. No.: 13/389,575

(22) PCT Filed: Apr. 12, 2010

(86) PCT No.: PCT/JP2010/002634
§ 371 (c)(1),
(2), (4) Date: Feb. 8, 2012

(87) PCT Pub. No.: WO2011/021319
PCT Pub. Date: Feb. 24, 2011

(65) Prior Publication Data
US 2012/0140833 A1 Jun. 7, 2012

(30) Foreign Application Priority Data
Aug. 21, 2009 (JP) ................. 2009-191616

(51) Int. Cl.
*G06F 15/16* (2006.01)
*G06F 13/00* (2006.01)
*H04N 19/20* (2014.01)
*H04N 19/00* (2014.01)
*G06F 3/14* (2006.01)
*H04N 19/507* (2014.01)

(52) U.S. Cl.
CPC ............. *H04N 19/20* (2014.11); *H04N 7/26* (2013.01); *H04N 19/507* (2014.11); *G06F 3/1462* (2013.01); *G09G 2340/02* (2013.01); *H04N 19/00581* (2013.01)

(58) Field of Classification Search
None
See application file for complete search history.

(56) References Cited

U.S. PATENT DOCUMENTS

2006/0098738 A1* 5/2006 Cosman et al. .......... 375/240.16
2007/0147692 A1* 6/2007 Dwyer et al. ................ 382/233

FOREIGN PATENT DOCUMENTS

| JP | 1-154691 A | 6/1989 |
|---|---|---|
| JP | 9-37259 A | 2/1997 |
| JP | 2000-299865 A | 10/2000 |
| JP | 2002-281508 A | 9/2002 |
| JP | 2004-503862 A | 2/2004 |
| JP | 2004-186897 A | 7/2004 |
| JP | 2008-85502 A | 4/2008 |

OTHER PUBLICATIONS

International Search Report for PCT/JP2010/002634 dated Jul. 13, 2010.

* cited by examiner

*Primary Examiner* — Joseph Ustaris
*Assistant Examiner* — William Adrovel
(74) *Attorney, Agent, or Firm* — Sughrue Mion, PLLC

(57) ABSTRACT

This moving image coding device has an update region detection unit, a coding target region detection and cache update unit, and a coding unit. The update region detection unit compares a reference frame and a current frame, and detects an update region that a pixel value changed. The coding target region detection and cache update unit replaces an image of an update region in the reference frame with an image in a cache frame, and thereafter, detects a region that a pixel value changed as a coding target region and stores an image of a region that a pixel value did not change for a predetermined past period in the image of the update region in the reference frame before the replacement, into the cache frame as an image of a stable region. The coding unit codes an image of the coding target region and cache information.

14 Claims, 13 Drawing Sheets

MOVING IMAGE CODING DEVICE

CROSS REFERENCE TO RELATED APPLICATIONS

This application is a National Stage of International Application No. PCT/JP2010/002634 filed Apr. 12, 2010, claiming priority based on Japanese Patent Application No. 2009-191616 filed Aug. 21, 2009, the contents of all of which are incorporated herein by reference in their entirety.

TECHNICAL FIELD

The present invention relates to a device that codes a moving image signal, specifically, relates to a moving image coding device that reduces the coding amount in redrawing of the same image.

BACKGROUND ART

Various types of devices that transmit and receive moving images and video data have been proposed. For example, Patent Document 1 describes a thin client system that transmits and receives video data between a server device and a thin client terminal.

A moving image coding device in a thin client system generally employs a scheme of coding and transmitting image data of a rectangular region including an updated region in an image. For example, this type of transmission scheme is described in Patent Document 2. According to this transmission scheme, in a case that only a partial region in an image is updated, the need for coding and transmitting the whole image is eliminated and it is merely required to code and transmit only image data of the partial image, so that it is possible to reduce the amount of data to be transmitted.

In particular, regarding a video image displayed on a computer screen, it is rare that the whole screen is frequently redrawn, and it is general that pixel values do not change at all except in a partial region. Therefore, data reduction by such partial coding is quite effective.

On the other hand, as a coding scheme for more general moving image signals other than those of a computer screen, there are MPEG scheme defined by ISO/IEC and H.26x scheme defined by ITU.

These moving image coding schemes promote reduction of the transmission coding amount by motion compensation using a motion vector showing what position in a reference image a pixel block to be coded resembles.

Further, a moving image coding scheme defied as MPEG-4 AVC or H.264 employs a function (Multiple Reference Frame) of being capable of holding a plurality of frames before and after a coding target frame and selecting a reference image to be used for motion compensation from the frames. This type of motion compensation scheme is described in, for example, Patent Document 3.

Use of Multiple Reference Frame makes it possible to select and use a frame that is the most appropriate for estimation from the plurality of held frames when performing motion compensation. Accordingly, even when a subject in a video image is temporarily hidden by another object and then appears on a frame again, it is possible to perform motion estimation by using a frame in which the subject is not hidden as a reference image, with the result that the efficiency of coding becomes higher than when using only one reference image.

[Patent Document 1] Japanese Unexamined Patent Application Publication (Translation of PCT Application) No. 2004-503862
[Patent Document 2] Japanese Unexamined Patent Application Publication No. 2008-085502
[Patent Document 3] Japanese Unexamined Patent Application Publication No. 2004-186897

Regarding a video image on a computer screen, as well as a general moving image, there is a case that the same image is repeatedly drawn. For example, a wallpaper image on the background of a computer screen is redrawn every time a window opened thereon is closed. However, an object within the screen is not updated as frequently as a general moving image and, for example, there is a case that the same window image remains displayed in tens or hundreds of frames. Therefore, the wallpaper image on the background hidden by the window is redrawn after tens or hundreds of frames. Accordingly, the configuration of using a frame immediately before a coding target frame as a reference frame or the Multiple Reference Frame scheme using some frames before and after a coding target frame as reference frames cannot address such a situation.

SUMMARY

Accordingly, an object of the present invention is to provide a moving image coding device that solves a problem that, in a case that the same image is redrawn after a lapse of a comparatively long time, it is impossible to improve the coding efficiency only by using a latest frame image as a reference image.

A moving image coding device according to an exemplary embodiment of the present invention is provided with:

a reference frame memory configured to store a reference frame;

a current frame memory configured to store a current frame;

a cache frame memory configured to store a cache frame;

an update region detection unit configured to compare the reference frame and the current frame, and detect a region in which a pixel value has changed, as an update region;

a coding target region detection and cache update unit configured to, after executing a process of replacing an image of a region corresponding to the update region in the reference frame with an image of a region corresponding to the update region in the cache frame, compare the reference frame and the current frame to detect a region in which a pixel value has changed as a coding target region, and store an image of a region in which a pixel value has not changed for a predetermined past period in the image of the region corresponding to the update region in the reference frame before the replacing process, into the cache frame as an image of a stable region; and a coding unit configured to code an image of the region corresponding to the coding target region in the current frame, information showing a region in the reference frame in which an image has been replaced with an image of the cache frame, and information showing a region in the reference frame in which the image of the stable region has existed.

According to the present invention, it is possible to improve the coding efficiency in a case that the same image is redrawn after a lapse of a comparatively long time.

EXEMPLARY EMBODIMENTS

Next, an exemplary embodiment for implementing the present invention will be described in detail with reference to the drawings.

Figure 1:
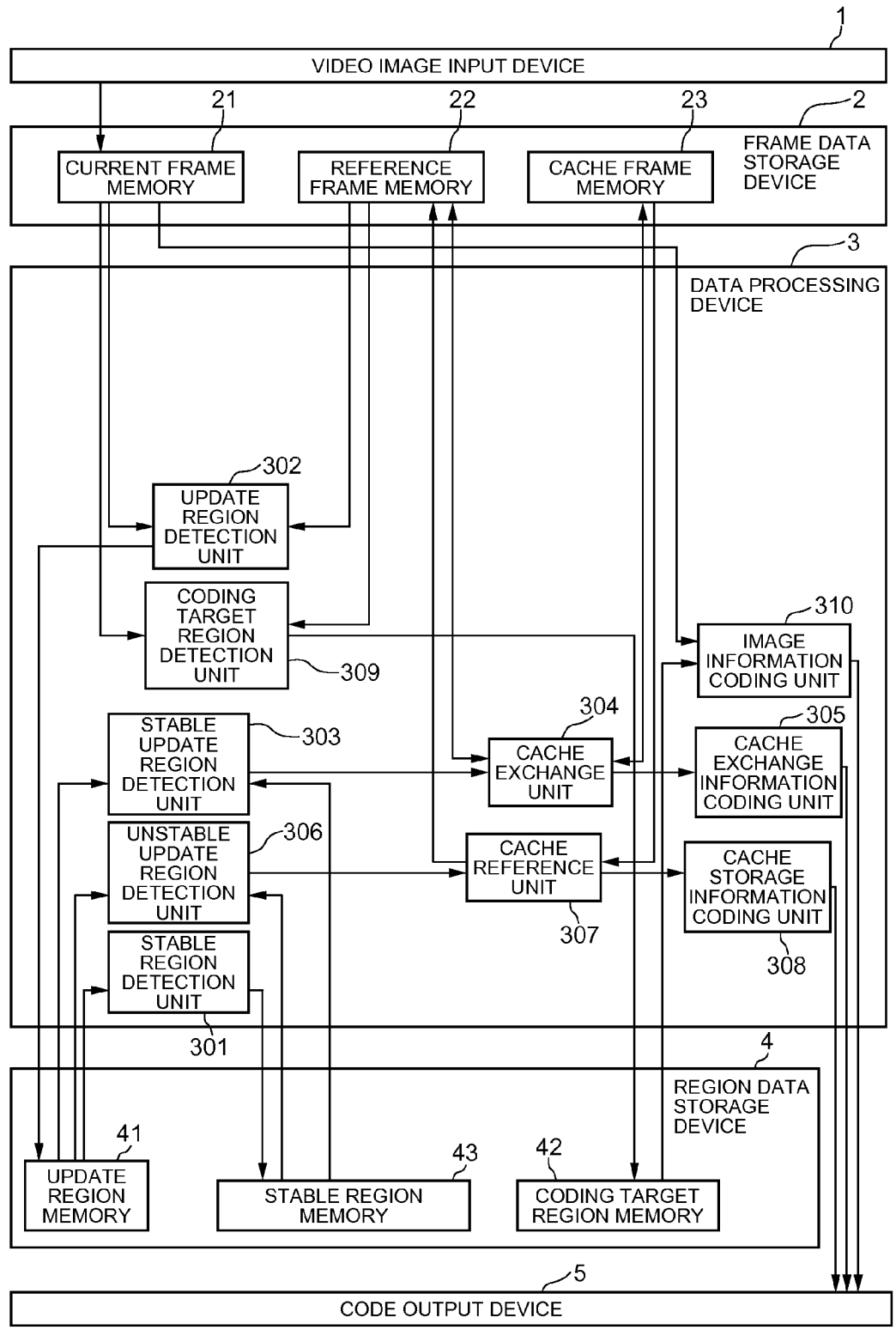
FIG. 1 is a block diagram showing a schematic configuration of a coding device according to a first exemplary embodiment of the present invention.

With reference to FIG. 1, a first exemplary embodiment of the present invention includes a video image input device 1, a frame data storage device 2, a data processing device 3 operating by program control, a region data storage device 4, and a code output device 5.

The video image input device 1 inputs a frame of a video image to be coded. A video image to be coded is, for example, a video image displayed on a screen of a display device of a computer. In this case, the video image input device 1 inputs a frame of a video image by digitally capturing the screen of the computer. The data processing device 3 is, for example, a personal computer. The frame data storage device 2 and the region data storage device 4 are, for example, semiconductor memories included in the personal computer. The code output device 5 is, for example, a communication device.

The frame data storage device 2 includes a current frame memory 21, a reference frame memory 22, and a cache frame memory 23.

The current frame memory 21 stores a frame of a video image to be coded currently. Into the current frame memory 21, a frame of a video image to be coded is read from the video image input device 1.

The reference frame memory 22 stores a frame of a video image having been coded immediately before. In an initial state that a frame of a video image having been coded immediately before does not exist, a frame configured by predetermined pixel values is stored.

The cache frame memory 23 stores a cache frame of the same size as a reference frame. The cache frame stores the value of a stable pixel, which is a pixel corresponding one-to-one to each pixel of the reference frame and updated most recently. Herein, a stable pixel refers to a pixel whose pixel value has not changed for a predetermined period (e.g., 30 frames) or more. Because the stored value is the value of the updated stable pixel, the value of a pixel having not been updated yet even if not changed for the predetermined period or more appears on the reference frame memory 22 but is not stored into the cache memory 23. In the initial state, the cache frame memory 23 stores a cache frame configured by a predetermined pixel value.

The region data storage device 4 includes an update region memory 41, a coding target region memory 42, and a stable region memory 43.

The update region memory 41 stores data relating to an updated region in a predetermined number of past frames.

The stable region memory 43 stores information showing a stable region. A stable region refers to a region in which the screen has not been updated recently, specifically, a region that has not been updated at all in a predetermined number of past frames.

The coding target region memory 42 stores information showing a region to be coded in a current frame.

The data processing device 3 includes a stable region detection unit 301, an update region detection unit 302, a stable update region detection unit 303, a cache exchange unit 304, a cache exchange information coding unit 305, an unstable update region detection unit 306, a cache reference unit 307, a cache reference information coding unit 308, a coding target region detection unit 309, and an image information coding unit 310.

Herein, the stable region detection unit 301, the stable update region detection unit 303, the cache exchange unit 304, the unstable update region detection unit 306, the cache reference unit 307 and the coding target region detection unit 309 configure a coding target region detection and cache updating unit. Moreover, the cache exchange information coding unit 305, the cache reference information coding unit 308 and the image information coding unit 310 configure a coding unit.

These units generally operate in the following manners, respectively.

The stable region detection unit 301 retrieves information of a past update region from the update region memory 41. Moreover, the stable region detection unit 301 detects a region in which the screen has not been updated recently as a stable region, and stores information showing the region into the stable region memory 43.

The update region detection unit 302 retrieves an image of a current frame from the current frame memory 21, and retrieves an image of a reference frame from the reference frame memory 22. The update region detection unit 302 compares the two frame images having been retrieved, detects a region having been updated within the frame (a region in which a pixel value has changed), and stores information of the region into the update region memory 41 as information of an update region.

The stable update region detection unit 303 retrieves the information of the update region of the current frame from the update region memory 41, and retrieves the information of the stable region from the stable region memory 43. Furthermore, the stable update region detection unit 303 notifies the cache exchange unit 304 of an overlap region A between the update region and stable region that the information has been retrieved as a stable update region.

When notified of the stable update region by the stable update region detection unit 303, the cache exchange unit 304 exchanges the value of a pixel included within the stable update region between the reference frame memory 22 and the cache frame memory 23. That is to say, regarding certain coordinates within the stable update region, a pixel value stored in the reference frame memory 22 is written into the same coordinates of the cache frame memory 23 and, on the contrary, a pixel value stored in the cache frame memory 23 is written into the same coordinates of the reference frame memory 22. Next, the cache exchange unit 304 notifies the cache exchange information coding unit 305 of information of the region that the pixel value has been exchanged.

The cache exchange information coding unit 305 codes the information of the region that the pixel value has been exchanged by the cache exchange unit 304, and outputs to the code output device 5 as a cache exchange information code.

The unstable update region detection unit 306 retrieves the information of the update region of the current frame from the update region memory 41, and retrieves the information of the stable region from the stable region memory 43. Next, the unstable update region detection unit 306 obtains an unstable region, i.e., a region that is not included in the stable region within the frame. Furthermore, the unstable update region detection unit 306 notifies the cache reference unit 307 of an overlap region B between the update region that the information has been retrieved and the unstable region as an unstable update region.

When notified of the unstable update region by the unstable update region detection unit 306, the cache reference unit 307 copies the value of a pixel included within the unstable update region from the cache frame memory 23 to the reference frame memory 22. That is to say, regarding certain coordinates within the unstable update region, the cache reference unit 307 writes a pixel value stored in the cache frame memory 23 into the same coordinates in the reference frame memory 22. Next, the cache reference unit 307 notifies the cache reference information coding unit 308 of the information of the region that the pixel value has been referred to.

The cache reference information coding unit 308 codes the information of the region that the pixel value has been referred to by the cache reference unit 307, and outputs to the code output device 5 as a cache reference information code.

After the pixel values included within the update region detected by the update region detection unit 302 are copied from the cache frame memory 23 to the reference frame memory 22 by the cache exchange unit 304 and the cache reference unit 307, the coding target region detection unit 309 retrieves the image of the current frame from the current frame memory 21, and retrieves the image of the reference frame from the reference frame memory 22. The coding target region detection unit 309 compares the two frame images having been retrieved, detects a region having been updated within the frame (a region in which a pixel value has changed), and outputs information of the region to the coding target region memory 42 as information of a coding target region.

The image information coding unit 310 retrieves the information of the coding target region from the cording target region memory 42, retrieves a pixel value included in the coding target region from the current frame memory 21, codes as an image, and outputs to the code output device 5.

Figure 2:
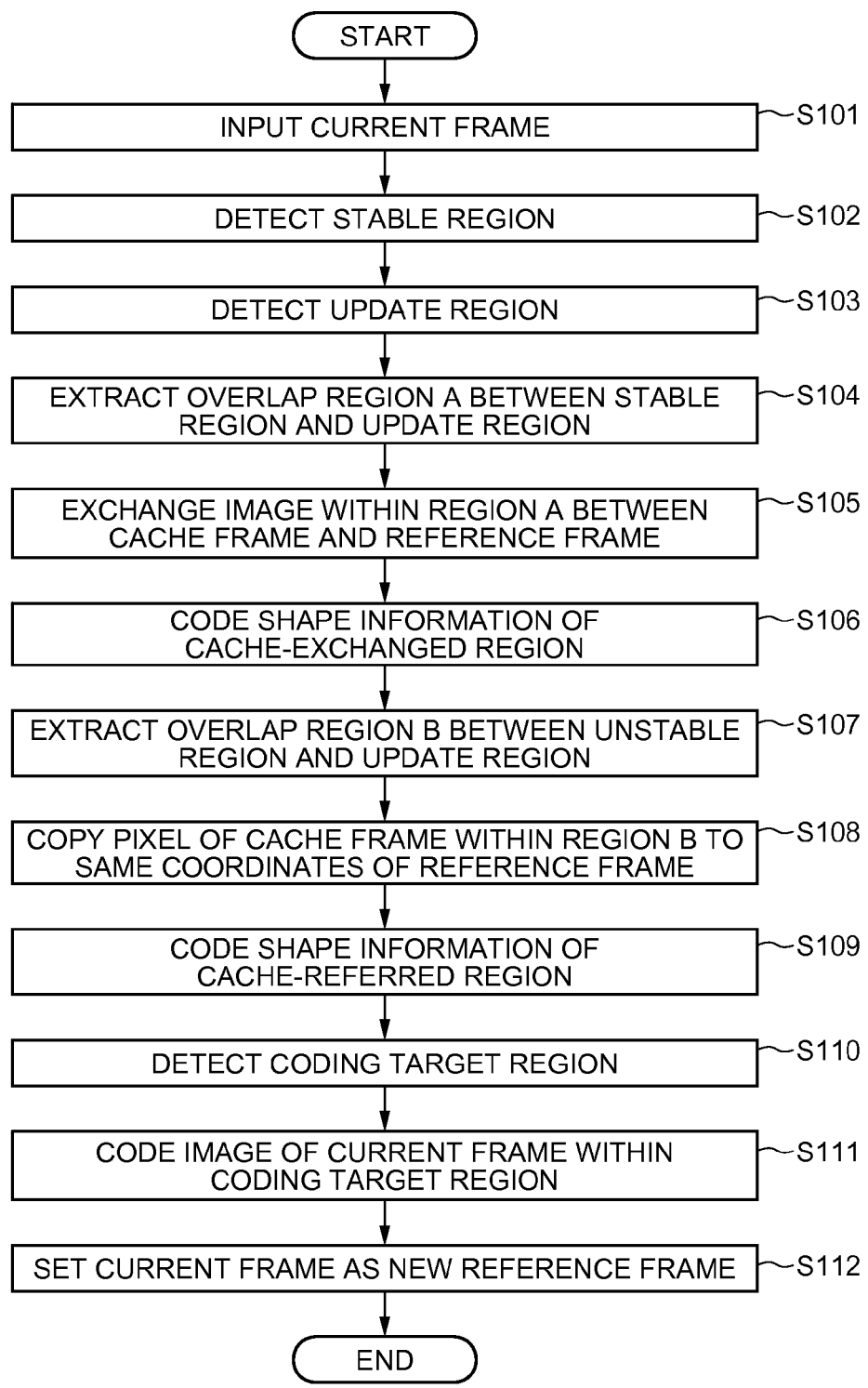
FIG. 2 is a flowchart showing a flow of a process according to the first exemplary embodiment of the present invention.

Next, with reference to FIG. 1 and a flowchart of FIG. 2, an operation of the exemplary embodiment of the present invention as a whole will be described in detail.

At first, a frame of a video image to be coded is read into the current frame memory 21 by the video image input device 1 (step S101).

Next, the stable region detection unit 301 retrieves information of a past update region from the update region memory 41. Moreover, the stable region detection unit 301 detects a region in which the screen has not been updated recently as a stable region and stores information showing the region into the stable region memory 43 (step S102).

Next, the update region detection unit 302 retrieves an image of a current frame from the current frame memory 21, and retrieves an image of a reference frame from the reference frame memory 22. The update region detection unit 302 compares the two frame images having been retrieved, detects a region having been updated within the frame, and stores information of the region into the update region memory 41 (step S103).

Next, the stable update region detection unit 303 retrieves the information of the update region of the current frame from the update region memory 41, and retrieves the information of the stable region from the stable region memory 43. Moreover, the stable update region detection unit 303 notifies the cache exchange unit 304 of an overlap region A between the update region and stable region that the information has been retrieved as a stable update region (step S104).

Next, when notified of the stable update region by the stable update region detection unit 303, the cache exchange unit 304 exchanges the value of a pixel included within the stable update region between the reference frame memory 22 and the cache frame memory 23. That is to say, regarding certain coordinates within the stable update region, the cache exchange unit 304 writes a pixel value stored in the reference frame memory 22 into the same coordinates in the cache frame memory 23 and, on the contrary, writes a pixel value stored in the cache frame memory 23 into the same coordinates in the reference frame memory 22. Next, the cache exchange unit 304 notifies the cache exchange information coding unit 305 of information of the region that the pixel value has been exchanged (step S105).

Next, the cache exchange information coding unit 305 codes the information of the region that the pixel value has been exchanged by the cache exchange unit 304, and outputs to the code output device 5 (step S106).

Next, the unstable update region detection unit 306 retrieves the information of the update region of the current frame from the update region memory 41, and retrieves the information of the stable region from the stable region memory 43. Next, the unstable update region detection unit 306 obtains an unstable region, i.e., a region that is not included in the stable region within the frame. Moreover, the unstable update region detection unit 306 notifies the cache reference unit 307 of an overlap region B between the update region that the information has been retrieved and the unstable region as an unstable update region (step S107).

Next, when notified of the unstable update region by the unstable update region detection unit 306, the cache reference unit 307 copies the value of a pixel included within the unstable update region from the cache frame memory 23 to the reference frame memory 22. That is to say, regarding certain coordinates within the unstable update region, the cache reference unit 307 writes a pixel value stored in the cache frame memory 23 into the same coordinates in the reference frame memory 22. Next, the cache reference unit 307 notifies the cache reference information coding unit 308 of information of the region that the pixel value has been referred to (step S108).

Next, the cache reference information coding unit 308 codes the information of the region that the pixel value has been referred to by the cache reference unit 307, and outputs to the code output device 5 (step S109).

Next, the coding target region detection unit 309 retrieves the image of the current frame from the current frame memory 21, and retrieves the image of the reference frame from the reference frame memory 22. The coding target region detection unit 309 compares the two frame images having been retrieved, detects a region having been updated within the frame, and outputs information of the region to the coding target region memory 42 (step S110).

Next, the image information coding unit 310 retrieves the information of the coding target region from the coding target region memory 42, retrieves a pixel value included in the coding target region from the current frame memory 21, codes as an image, and outputs to the code output device 5 (step S111).

Finally, in a case that a following frame is to be subsequently processed, the current frame becomes a new reference frame (step S112)

Next, taking coding of a computer screen as an example, the operation of the exemplary embodiment of the present invention will be described more specifically.

To be specific, the following example will be considered: coding a video image on a computer screen that, after keeping a first moving image window open on a background screen for a while, opens a second moving image window so as to partially overlap the first moving image window and returns to the original state that only the first moving image window is opened again.

Figure 3:
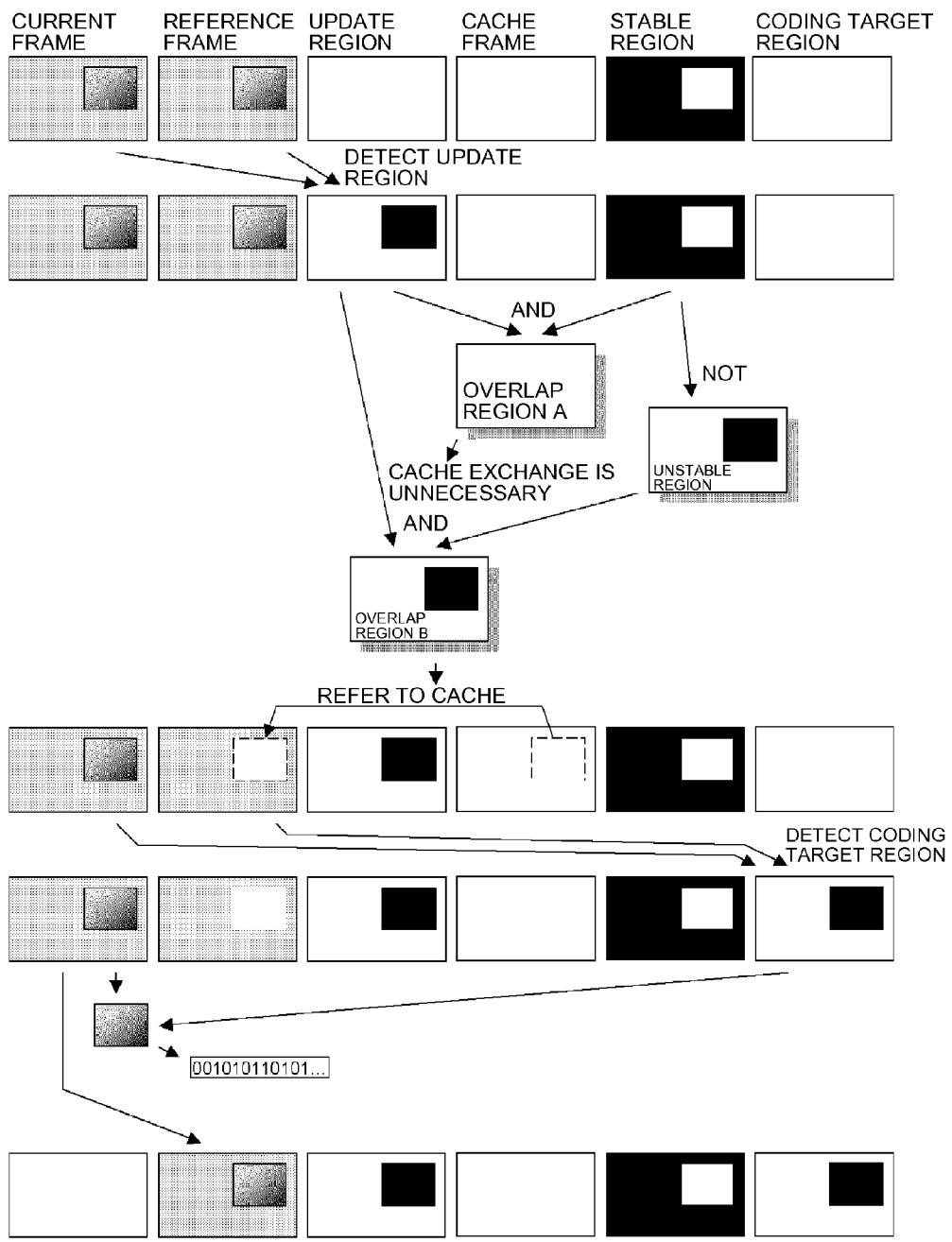
FIG. 3 is a diagram schematically showing an operation of the first exemplary embodiment of the present invention.

FIG. 3 schematically shows an operation of coding one frame during a period that the first moving image window is kept opened on the background screen for a while. A rectangular region drawn in each of a current frame and a reference frame displayed on the top line represents a first moving image window, and the remaining part represents the background.

When the current frame is inputted (step S101), the stable region detection unit 301 retrieves information of a past update region from the update region memory 41, detects a region that the screen has not been updated recently as a stable region, and stores information showing the region into the stable region memory 43 (step S102). In a case that the first moving image window is kept opened on the background screen, a region of the first moving image window is frequently updated and, on the other hand, the background part is not updated. Therefore, as shown in FIG. 3, the background part, which is other than the first moving image window, is a stable region. In the drawing, the stable region is shown in black color, and an unstable region is shown in white color.

Next, the update region detection unit 302 compares the current frame with the reference frame, detects the region of the first moving image window as a region having been updated within the frame, and stores information of the region into the update region memory 41 (step S103).

Next, the stable update region detection unit 303 obtains an overlap region A between the update region of the current frame retrieved from the update region memory 41 and the stable region retrieved from the stable region memory 43, but there is no overlap region in the example of FIG. 3. Therefore, either cache exchange or coding of cache exchange information is not performed.

Next, the unstable update region detection unit 306 notifies the cache reference unit 307 of an overlap region B between the update region of the current frame retrieved from the update region memory 41 and the unstable region obtained from the information of the stable region retrieved from the stable region memory 43 as an unstable update region (step S107). In the example of FIG. 3, the region of the first moving image window is notified as the overlap region B. Therefore, the cache reference unit 307 copies the value of a pixel included in the region of the first moving image window from the cache frame memory 23 to the reference frame memory 22 (step S108). Moreover, the cache reference information coding unit 308 codes information of the region that the pixel value has been referred to by the cache reference unit 307, and outputs to the code output device 5 (step S109).

Next, the coding target region detection unit 309 compares the current frame retrieved from the current frame memory 21 with the reference frame retrieved from the reference frame memory 22, detects the region of the first moving image window as a region having been updated in the frame, and outputs information of the region to the coding target region memory 42 (step S110).

Next, the image information coding unit 310 retrieves, from the current frame memory 21, the value of a pixel included in the first moving image window that is a coding target region, codes as an image, and outputs to the code output device 5 (step S111).

Finally, for the purpose of subsequently processing a following frame, the current frame becomes a new reference frame (step S112).

Thus, in a case that the first moving image window is opened on the background screen, an image part of the first window is coded and outputted to the code output device 5.

Figure 4:
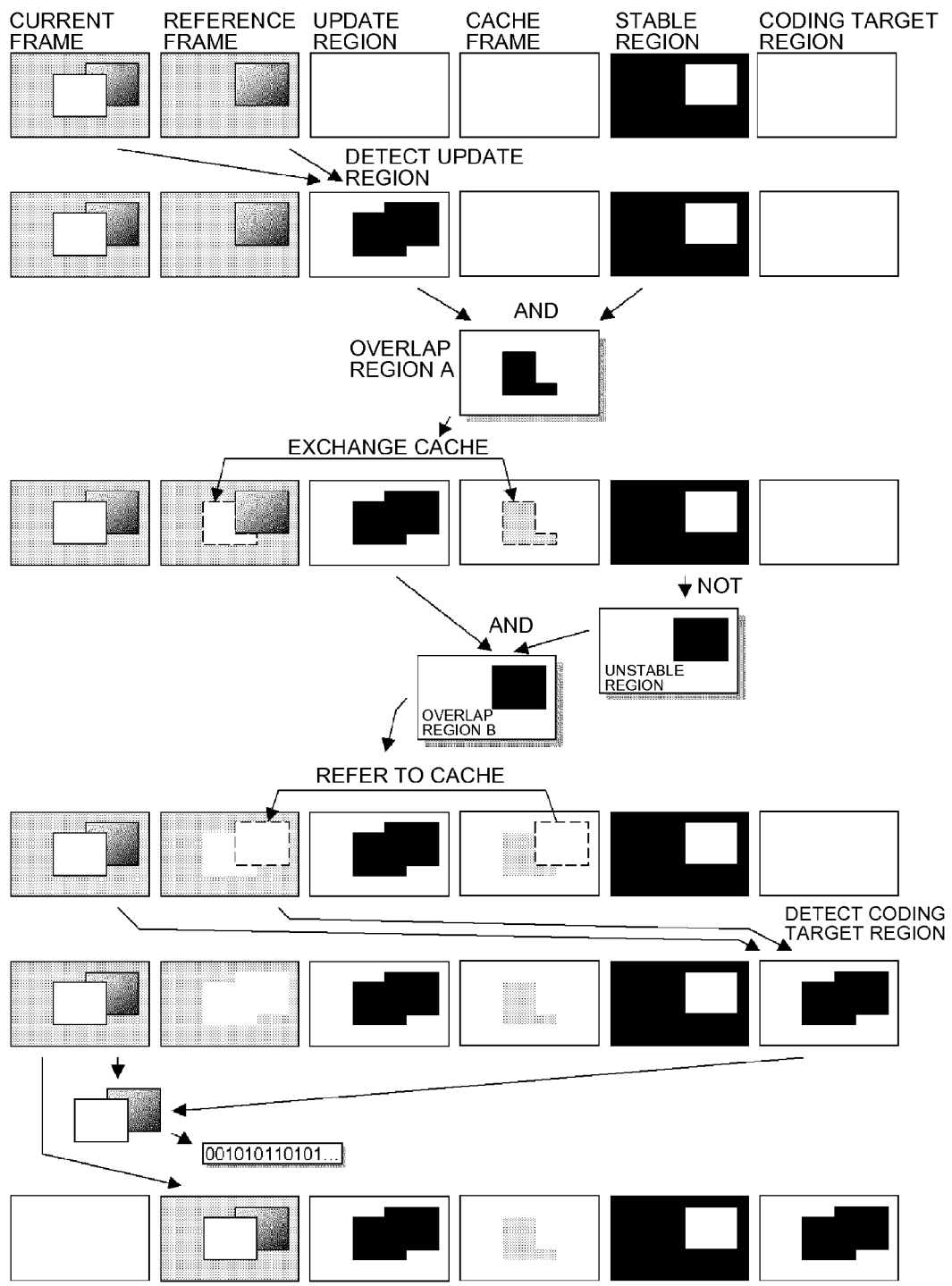
FIG. 4 is a diagram schematically showing an operation of the first exemplary embodiment of the present invention.

FIG. 4 schematically shows an operation of coding a current frame at a moment that the second moving image window is first opened so as to partially overlap the first moving image window. Another rectangular region added into the current frame displayed on the top line represents the second moving image window.

When the current frame is inputted (step S101), the stable region detection unit 301 retrieves information of a past update region from the update region memory 41, detects a region that the screen has not been updated recently as a stable region, and stores information showing the region into the stable region memory 43 (step S102). At the moment that the second moving image window is first opened so as to partially overlap the first moving image window, the stable region is the same as in FIG. 3.

Next, the update region detection unit 302 compares the current frame with a reference frame, detects a region of the first and second moving image windows as a region having been updated within the frame, and stores information of the region into the update region memory 41 (step S103).

Next, the stable update region detection unit 303 obtains an overlap region A between the update region of the current frame retrieved from the update region memory 41 and the stable region retrieved from the stable region memory 43. In the example of FIG. 4, the overlap region A is a region in the second moving image window that does not overlap the first moving image window. Therefore, the cache exchange unit 304 exchanges the value of a pixel included in the region in the second moving image window that does not overlap the first moving image window between the reference frame memory 22 and the cache frame memory 23. Consequently, the region in the second moving image window that does not overlap the first moving image window in the reference frame memory 22 is replaced with the pixel value of the initial state stored in the cache frame. Moreover, the region in the second moving image window that does not overlap the first moving image window in the cache frame memory 23 is replaced with a pixel value of a background image of the computer screen. Moreover, the cache exchange information coding unit 305 codes the information of the overlap region A and outputs to the code output device 5 (step S106).

Next, the unstable update region detection unit 306 notifies the cache reference unit 307 of an overlap region B between the update region of the current frame retrieved from the update region memory 41 and the unstable region obtained from the information of the stable region retrieved from the stable region memory 43 as an unstable update region (step S107). In the example of FIG. 4, the region of the first moving image window is notified as the overlap region B. Therefore, the cache reference unit 307 copies the value of a pixel included in the region of the first moving image window from the cache frame memory 23 to the reference frame memory 22 (step S108). Consequently, the region of the first moving image window in the reference frame memory 22 is replaced with the pixel value of the initial state stored in the cache frame. Moreover, the cache reference information coding unit 308 codes information of the region that the pixel value has been referred to by the cache reference unit 307, and outputs to the code output device 5 (step S109).

Next, the coding target region detection unit 309 compares the current frame retrieved from the current frame memory 21 with the reference frame retrieved from the reference frame memory 22, detects the region of the first and second moving image windows as a region having been updated in the frame, and outputs information of the region to the coding target region memory 42 (step S110).

Next, the image information coding unit 310 retrieves the value of a pixel included in the first and second moving image windows as a coding target region from the current frame memory 21, codes as an image, and outputs to the code output device 5 (step S111).

Finally, for the purpose of subsequently processing a following frame, the current frame becomes a new reference frame (step S112).

Thus, at the moment that the second moving image window is opened at first so as to partially overlap the first moving image window, an image part of the first and second windows is coded and outputted to the code output device 5. After that, during a period that the second moving image window is displayed so as to partially overlap the first moving image window, the region of the first and second moving image windows is coded as a coding target.

Figure 5:
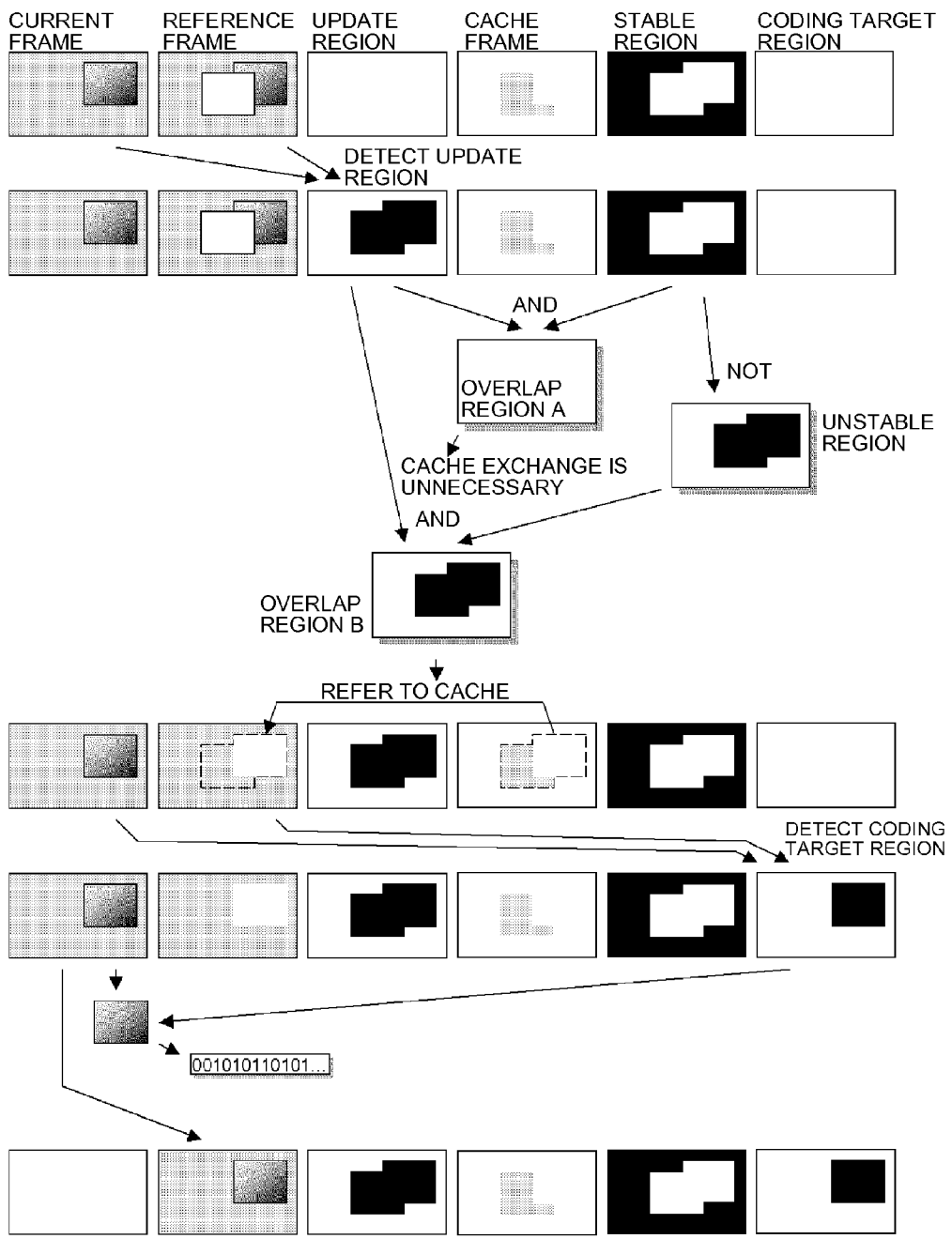
FIG. 5 is a diagram schematically showing an operation of the first exemplary embodiment of the present invention.

FIG. 5 schematically shows an operation of coding a current frame at a moment that the second moving image window is closed and the screen is returned to the original state that only the first moving image window is opened again.

When the current frame is inputted (step S101), the stable region detection unit 301 retrieves information of a past update region from the update region memory 41, detects a region that the screen has not been updated recently as a stable region, and stores information showing the region into the stable region memory 43 (step S102). At the moment that the second moving image window is closed and the screen is returned to the original state that only the first moving image window is opened again, the stable region is a region excluding the first and second moving image windows as in the period that the second moving image window is displayed so as to partially overlap the first moving image window.

Next, the update region detection unit 302 compares the current frame with a reference frame, detects a region of the first and second moving image windows as a region having been updated within the frame, and stores information of the region into the update region memory 41 (step S103).

Next, the stable update region detection unit 303 obtains an overlap region A between the update region of the current frame retrieved from the update region memory 41 and the stable region retrieved from the stable region memory 43, but there is no overlap region. Therefore, either cache exchange or coding of cache exchange information is not performed.

Next, the unstable update region detection unit 306 notifies the cache reference unit 307 of an overlap region B between the update region of the current frame retrieved from the update region memory 41 and the unstable region obtained from the information of the stable region retrieved from the stable region memory 43 as an unstable update region (step S107). In the example of FIG. 5, the region of the first and second moving image windows is notified as the overlap region B. Therefore, the cache reference unit 307 copies the value of a pixel included in the region of the first and second moving image windows from the cache frame memory 23 to the reference frame memory 22 (step S108). Consequently, the pixel value in the initial state stored in the cache frame is stored into the region of the first moving image window in the reference frame memory 202, and the pixel value of the background screen stored in the cache frame is stored into a region of the second moving image window that does not overlap the first moving image window. Moreover, the cache reference information coding unit 308 codes information of the region that the pixel value has been referred to by the cache reference unit 307, and outputs to the code output device 5 (step S109).

Next, the coding target region detection unit 309 compares the current frame retrieved from the current frame memory 21 with the reference frame retrieved from the reference frame memory 22, detects the region of the first moving image window as a region having been updated in the frame, and outputs information of the region to the coding target region memory 42 (step S110).

Next, the image information coding unit 310 retrieves the value of a pixel included in the first moving image window that is a coding target region from the current frame memory 21, codes as an image, and outputs to the code output device 5 (step S111).

Finally, for the purpose of subsequently processing a following frame, the current frame becomes a new reference frame (step S112).

Thus, at the moment that the second moving image window is closed and the screen is returned to the original state that only the first moving image window is opened again, an image part of the first window is coded and outputted to the code output device 5.

Next, an effect of this exemplary embodiment will be described.

In this exemplary embodiment, a frame buffer for cache is held, and an image having been drawn in a region that is a stable region (a region that has not been updated recently and is stable) and is a region updated at this frame is accumulated into a cache frame. Consequently, it is possible to preferentially retain a region that is likely to be redrawn, such as a background region of a computer screen, as a cache.

Further, in this exemplary embodiment, regarding a region determined as an update region, a pixel value of a cache frame is copied to a reference frame (or a pixel value of a cache frame is exchanged with a pixel value of a reference frame), and detection of a coding target region is performed again. Thus, because a pixel whose value coincides with a pixel value of a cache in a region determined as an update region at first does not cause a difference at the time of detection of a coding target region, the coding target region can be small, with the result that it is possible to decrease the coding amount.

A method for coding information of each region has not been mentioned in the above description, but, for example, in a case that a region is rectangular, it is possible to express information of the region by coordinate values of upper, lower, right and left edges.

Further, in the case of coding a region of any shape other than a rectangle, it is possible to code in the form of a two-dimensional image. For example, it is possible to form a binary two-dimensional image showing a pixel inside the region by 0 and a pixel outside the region by 1, and code by a coding scheme such as MMR (Modified Modified Read).

Next, a second exemplary embodiment of the present invention will be described in detail with reference to the drawings.

Figure 6:
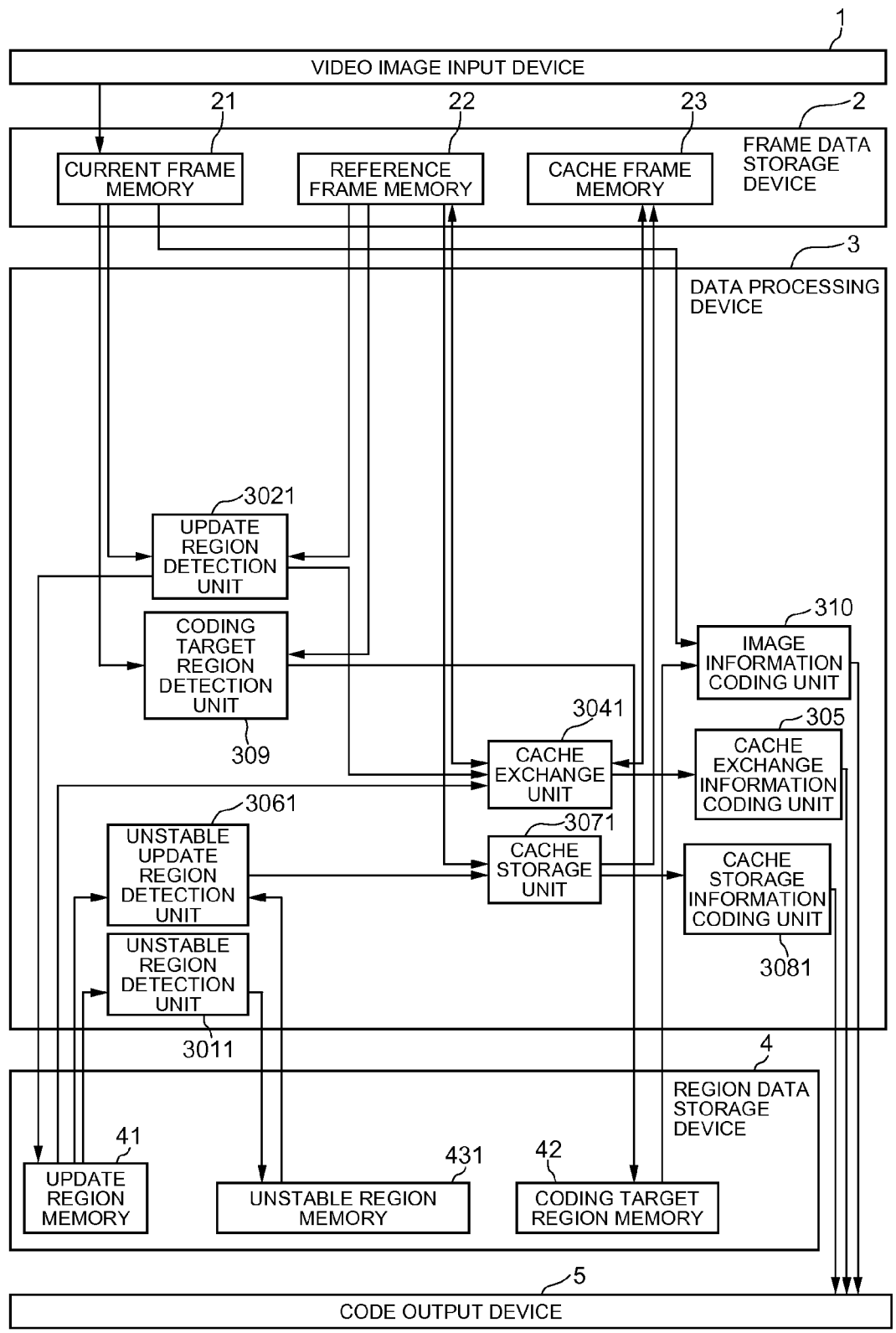
FIG. 6 is a block diagram showing a schematic configuration of a coding device according to a second exemplary embodiment of the present invention.

With reference to FIG. 6, the second exemplary embodiment of the present invention is configured by: removing the stable update region detection unit 303 of the data processing device 3 of the first exemplary embodiment; replacing the stable region detection unit 301 with an unstable region detection unit 3011, the update region detection unit 302 with an update region detection unit 3021, the cache exchange unit 304 with a cache exchange unit 3041, the unstable update region detection unit 306 with an unstable update region detection unit 3061, the cache reference unit 307 with a cache storage unit 3071, and the cache reference information coding unit 308 with a cache storage information coding unit 3081; and replacing the stable region memory 43 of the region data storage device 4 of the first exemplary embodiment with an unstable region memory 431.

Herein, the unstable region detection unit 3011, the unstable update region detection unit 3061, the cache exchange unit 3041, the cache storage unit 3071 and the coding target region detection unit 309 configure a coding target region detection and cache updating unit. Moreover, the cache exchange information coding unit 305, the cache storage information coding unit 3081 and the image information coding unit 310 configure a coding unit.

These units generally operate in the following manner, respectively.

The unstable region detection unit 3011 retrieves information of a past update region from the update region memory 41. Moreover, the unstable region detection unit 3011 detects a recently updated region as an unstable region, and stores information showing the region into the unstable region memory 431. In this exemplary embodiment, an unstable region is detected by a simple method: obtaining one rectangular region including all update regions of a given number of the latest frames, and considering the obtained region as an unstable region.

The update region detection unit 3021 retrieves an image of a current frame from the current frame memory 21, and retrieves an image of a reference frame from the reference frame memory 22. The update region detection unit 3021 compares the two frame images having been retrieved, detects a region having been updated within the frame in the form of a single rectangle or a plurality of rectangles, and outputs information of the region (the update region) to the update region memory 41. Moreover, the update region detection unit 3021 notifies the cache exchange unit 3041 of the information of the update region.

When notified of the update region by the update region detection unit 3021, the cache exchange unit 3041 exchanges the value of a pixel included in the update region between the reference frame memory 22 and the cache frame memory 23. That is to say, regarding certain coordinates within the update region, the cache exchange unit 3041 writes a pixel value stored in the reference frame memory 22 into the same coordinates of the cache frame memory 23 and, on the contrary, writes a pixel value stored in the cache frame memory 23 into the same coordinates of the reference frame memory 22. Next, the cache exchange unit 304 notifies the cache exchange information coding unit 305 of information of the region that the pixel value has been exchanged.

The cache exchange information coding unit 305 codes the information of the region that the pixel value has been exchanged by the cache exchange unit 304, and outputs to the code output device 5.

The unstable update region detection unit 3061 retrieves the information of the update region of the current frame from the update region memory 41, and retrieves the information of the unstable region from the unstable region memory 431. Next, the unstable update region detection unit 3061 notifies the cache storage unit 3071 of an overlap region B between the update region and unstable region having been retrieved, as an unstable update region.

When notified of the unstable update region by the unstable update region detection unit 3061, the cache storage unit 3071 copies the value of a pixel included in the unstable update region from the reference frame memory 22 to the cache frame memory 23. That is to say, regarding certain coordinates in the unstable update region, the cache storage unit 3071 writes a pixel value stored in the reference frame memory 22 into the same coordinates of the cache frame memory 23. Next, the cache storage unit 3071 notifies the cache storage information coding unit 3081 of information of the region that the pixel value has been stored.

The cache storage information coding unit 3081 codes the information of the region that the pixel value has been stored by the cache storage unit 3071, and outputs to the code output device 5.

The coding target region detection unit 309 retrieves the image of the current frame from the current frame memory 21, and retrieves the image of the reference memory from the reference frame memory 22. The coding target region detection unit 309 compares the two frame images having been retrieved, detects a region having been updated within the frame, and outputs information of the region to the coding target region memory 42.

The image information coding unit 310 retrieves the information of the coding target region from the coding target region memory 42, retrieves the value of a pixel included in the coding target region from the current frame memory 21, codes as an image, and outputs to the code output device 5.

Figure 7:
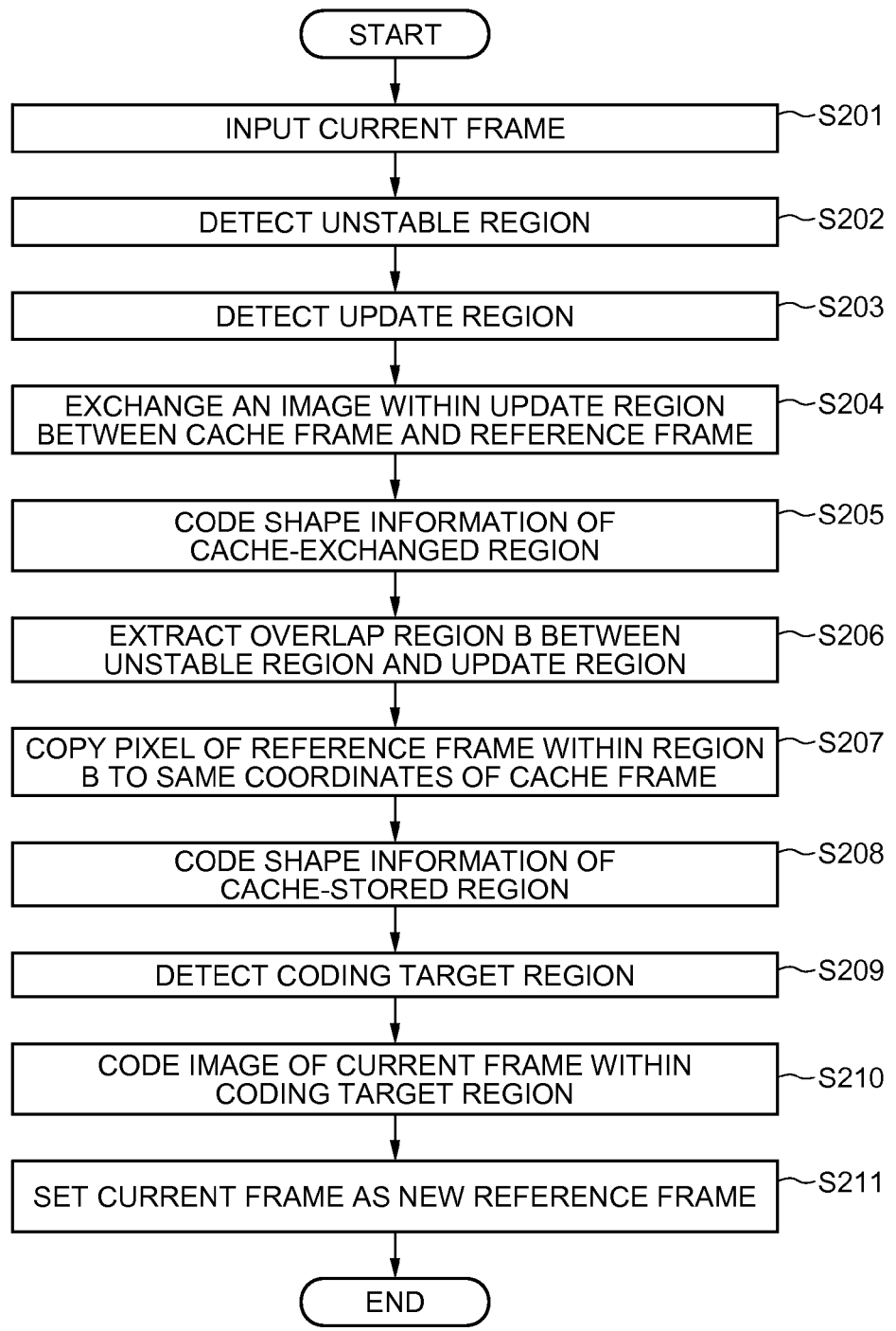
FIG. 7 is a flowchart showing a flow of a process according to the second exemplary embodiment of the present invention.

Next, with reference to FIG. 6 and a flowchart of FIG. 7, an operation of this exemplary embodiment as a whole will be described in detail.

At first, a frame of a video image to be coded is read into the current frame memory 21 by the video image input device 1 (step S201).

Next, the unstable region detection unit 3011 retrieves information of a past update region from the update region memory 41. Moreover, the unstable region detection unit 3011 detects a recently updated region as an unstable region, and stores information showing the region into the unstable region memory 431. In this exemplary embodiment, an unstable region is detected by a simple method: obtaining one rectangular region including all update regions of a given number of the latest frames, and considering the obtained region as an unstable region (step S202).

Next, the update region detection unit 3021 retrieves an image of a current frame from the current frame memory 21, and retrieves an image of a reference frame from the reference frame memory 22. The update region detection unit 3021 compares the two frame images having been retrieved, detects a region having been updated within the frame in the form of a single rectangle or a plurality of rectangles, and outputs information of the region to the update region memory 41. Moreover, the update region detection unit 3021 notifies the cache exchange unit 3041 of the information of the update region (step S203).

Next, when notified of the update region by the update region detection unit 3021, the cache exchange unit 3041 exchanges the value of a pixel included in the update region between the reference frame memory 22 and the cache frame memory 23. That is to say, regarding certain coordinates within the update region, the cache exchange unit 3041 writes a pixel value stored in the reference frame memory 22 into the same coordinates of the cache frame memory 23 and, on the contrary, writes a pixel value stored in the cache frame memory 23 into the same coordinates of the reference frame memory 22. Next, the cache exchange unit 3041 notifies the cache exchange information coding unit 305 of information of the region that the pixel value has been exchanged (step S204).

Next, the cache exchange information coding unit 305 codes the information that the pixel value has been exchanged by the cache exchange unit 3041, and outputs to the code output device 5 (step S205).

Next, the unstable update region detection unit 3061 retrieves the information of the update region of the current frame from the update region memory 41, and retrieves the information of the unstable region from the unstable region memory 431. Next, the unstable update region detection unit 3061 notifies the cache storage unit 3071 of an overlap region B between the update region and unstable region having been retrieved as an unstable update region (step S206).

Next, when notified of the unstable update region by the unstable update region detection unit 3061, the cache storage unit 3071 copies the value of a pixel included in the unstable update region from the reference frame memory 22 to the cache frame memory 23. That is to say, regarding certain coordinates within the unstable update region, the cache storage unit 3071 writes a pixel value stored in the reference frame memory 22 into the same coordinates of the cache frame memory 23. Next, the cache storage unit 3071 notifies the cache storage information coding unit 3081 of information of the region that the pixel value has been stored (step S207).

Next, the cache storage information coding unit 3081 codes the information of the region that the pixel value has been stored by the cache storage unit 3071, and outputs to the code output device 5 (step S208).

Next, the coding target region detection unit 309 retrieves the image of the current frame from the current frame memory 21, and retrieves the image of the reference frame from the reference frame memory 22. The coding target region detection unit 309 compares the two frame images having been retrieved, detects a region having been updated within the frame, and outputs information of the region to the coding target region memory 42 (step S209).

Next, the image information coding unit 310 retrieves the information of the coding target region from the coding target region memory 42, retrieves a pixel value included in the coding target region from the current frame memory 21, codes as an image, and outputs to the code output device 5 (step S210).

Finally, in the case of subsequently processing a following frame, the current frame becomes a new reference frame (step S211).

Next, taking coding of a computer screen as an example, the operation of this exemplary embodiment will be described more specifically.

To be specific, the same example as the specific example used in the first exemplary embodiment, i.e., the following example will be considered: coding a video image on a computer screen that, after keeping a first moving image window open on a background screen for a while, opens a second moving image window so as to partially overlap the first moving image window and returns to the original state that only the first moving image window is opened again.

Figure 8:
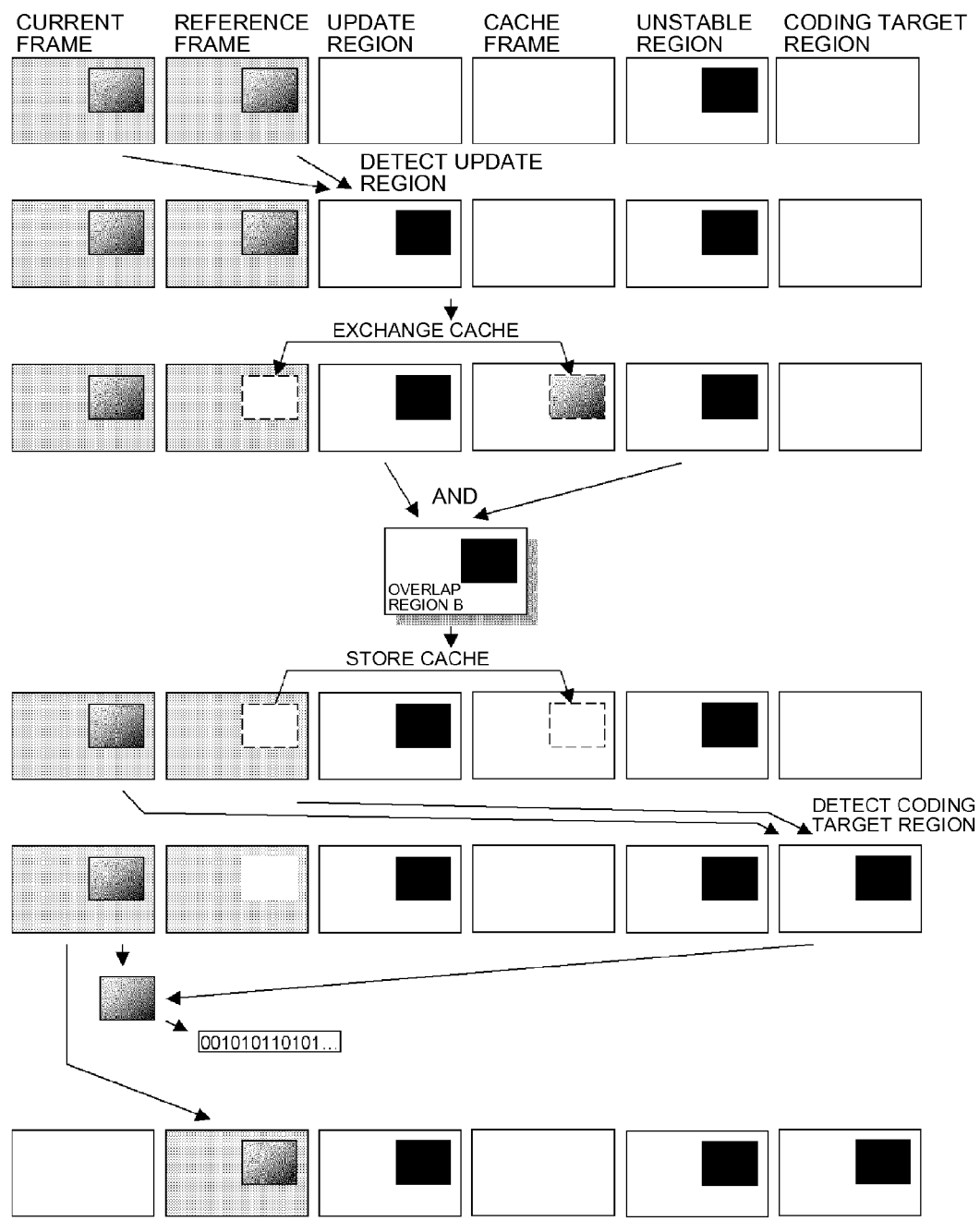
FIG. 8 is a diagram schematically showing an operation of the second exemplary embodiment of the present invention.

FIG. 8 schematically shows an operation of coding one frame during a period that the first moving image window is kept opened on a background screen for a while. A rectangular region drawn in each of a current frame and a reference frame displayed on the top line represents the first moving image window, and the remaining part represents the background.

When the current frame is inputted (step S201), the unstable region detection unit 3011 retrieves information of a past update region from the update region memory 41, detects one rectangular region including all recently updated regions as an unstable region, and stores information showing the region into the unstable region memory 431 (step S202). In a case that the first moving image window is kept opened on the background screen, a region of the first moving image window is frequently updated and, on the other hand, the background part is not updated. Therefore, as shown in FIG. 8, a part corresponding to the first moving image window is unstable. In the drawing, the unstable region is shown in black color, and a stable region is shown in white color.

Next, the update region detection unit 3021 compares the current frame with the reference frame, detects the region of the first moving image window as a region having been updated within the frame, stores information of the region into the update region memory 41, and notifies the cache exchange unit 3041 of the information (step S203).

Next, when notified of the update region by the update region detection unit 3021, the cache exchange unit 3041 exchanges the value of a pixel included in the update region between the reference frame memory 22 and the cache frame memory 23 (step S204). Thus, in the region of the first moving image window in the reference frame memory 22, the pixel value in the initial state stored in the cache frame is stored. Moreover, a pixel value of the region of the first moving image window is stored in the cache frame. Moreover, the cache exchange information coding unit 305 codes information of the region that the pixel value is exchanged by the cache exchange unit 304, and outputs to the code output device 5 (step S205).

Next, the unstable update region detection unit 3061 obtains the region of the first moving image window as an overlap region B between the update region of the current frame retrieved from the update region memory 41 and the unstable region retrieved from the unstable region memory 431, and notifies the cache storage unit 3071 of the obtained region as an unstable update region (step S206). When notified of the unstable update region by the unstable update region detection unit 3061, the cache storage unit 3071 copies the value of a pixel included in the unstable update region from the reference frame memory 22 to the cache frame memory 23 (step S207). Consequently, a pixel value of a region corresponding to the region of the first moving image window in the cache frame returns to the pixel value in the initial state. Moreover, the cache storage information coding unit 3081 codes information of the region that the pixel value has been stored by the cache storage unit 3071, and outputs to the code output device 5 (step S208).

Next, the coding target region detection unit 309 compares the current frame retrieved from the current frame memory 21 with the reference frame retrieved from the reference frame memory 22, detects the region of the first moving image window as a region having been updated within the frame, and outputs information of the region to the coding target region memory 42 (step S209).

Next, the image information coding unit 310 retrieves the value of a pixel included in the first moving image window from the current frame memory 21, codes as an image, and outputs to the code output device 5 (step S210).

Finally, for the purpose of subsequently processing a following frame, the current frame becomes a new reference frame (step S211).

Thus, in a case that the first moving image window is opened on the background screen, an image part of the first window is coded and outputted to the code output device 5.

Figure 9:
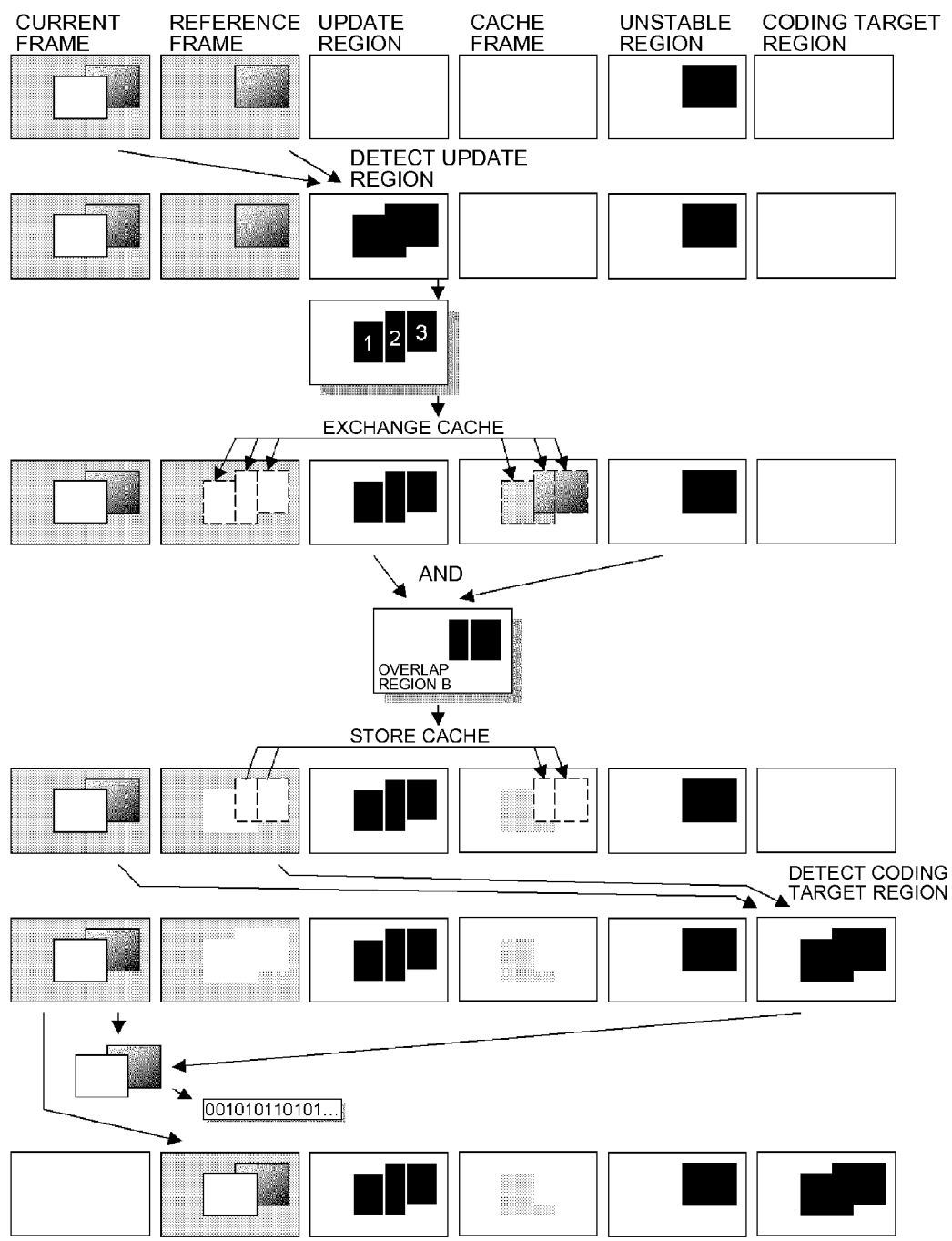
FIG. 9 is a diagram schematically showing an operation of the second exemplary embodiment of the present invention.

FIG. 9 schematically shows an operation of coding a current frame at a moment that the second moving image window is first opened so as to partially overlap the first moving image window. Another rectangular region added into the current frame displayed on the top line represents the second moving image window.

When the current frame is inputted (step S201), the unstable region detection unit 3011 retrieves information of a past update region from the update region memory 41, detects one rectangular region including all recently updated regions as an unstable region, and stores information showing the region into the unstable region memory 431 (step S202). At the moment that the second moving image window is first opened so as to partially overlap the first moving image window, the unstable region is the same as shown in FIG. 8.

Next, the update region detection unit 3021 compares the current frame with a reference frame, detects a region of the first and second moving image windows as a region having been updated within the frame, stores information of the region into the update region memory 41, and notifies the cache exchange unit 3041 of the information (step S203). Herein, the update region detection unit 3021 shows a set of update pixels of each frame by approximating the set by one rectangle or a set of rectangles. At this moment, update rectangles are determined so that all of the update pixels of each frame are included in any of the update rectangles of the frame. In FIG. 9, the set of the update pixels is expressed as a set of three rectangles.

Next, the cache exchange unit 3041 exchanges the value of a pixel included in the region of the first and second moving image windows between the reference frame memory 22 and the cache frame memory 23 (step S204). Consequently, in the region of the first and second moving image windows in the reference frame memory 22, the pixel value in the initial state stored in the cache frame is stored. Moreover, the pixel value of the first moving image window is stored in a region corresponding to the first moving image window in the cache frame memory 23, and the pixel value of the background image of the computer screen is stored in a region corresponding to the second moving image window that does not overlap the first window. Moreover, the cache exchange information coding unit 305 codes information of the region that the pixel value has been exchanged by the cache exchange unit 304, and outputs to the code output device 5 (step S205).

Next, the unstable update region detection unit 3061 obtains the region of the first moving image window as an overlap region B between the update region of the current frame retrieved from the update region memory 41 and the unstable region retrieved from the unstable region memory 431, and notifies the cache storage unit 3071 of the obtained region as an unstable update region (step S206). The cache storage unit 3071 copies the value of a pixel included in the unstable update region from the reference frame memory 22 to the cache frame memory 23 (step S207). Consequently, the pixel value of the region corresponding to the first moving image window region in the cache frame returns to the pixel value of the initial state. Moreover, the cache storage information coding unit 3081 codes information of the region that the pixel value has been stored by the cache storage unit 3071, and outputs to the code output device 5 (step S208).

Next, the coding target region detection unit 309 compares the current frame retrieved from the current frame memory 21 with the reference frame retrieved from the reference frame memory 22, detects the region of the first and second moving image windows as a region having been updated within the frame, and outputs information of the region to the coding target region memory 42 (step S209).

Next, the image information coding unit 310 retrieves the value of a pixel included in the first and second moving image windows from the current frame memory 21, codes as an image, and outputs to the code output device 5 (step S210).

Finally, for the purpose of subsequently processing a following frame, the current frame becomes a new reference frame (step S211).

Thus, at the moment that the second moving image window is first opened so as to partially overlap the first moving image window, an image part of the first and second windows is coded and outputted to the code output device 5. During a period that the second moving image window is displayed so as to partially overlap the first moving image window, the region of the first and second moving image windows is coded as a coding target.

Figure 10:
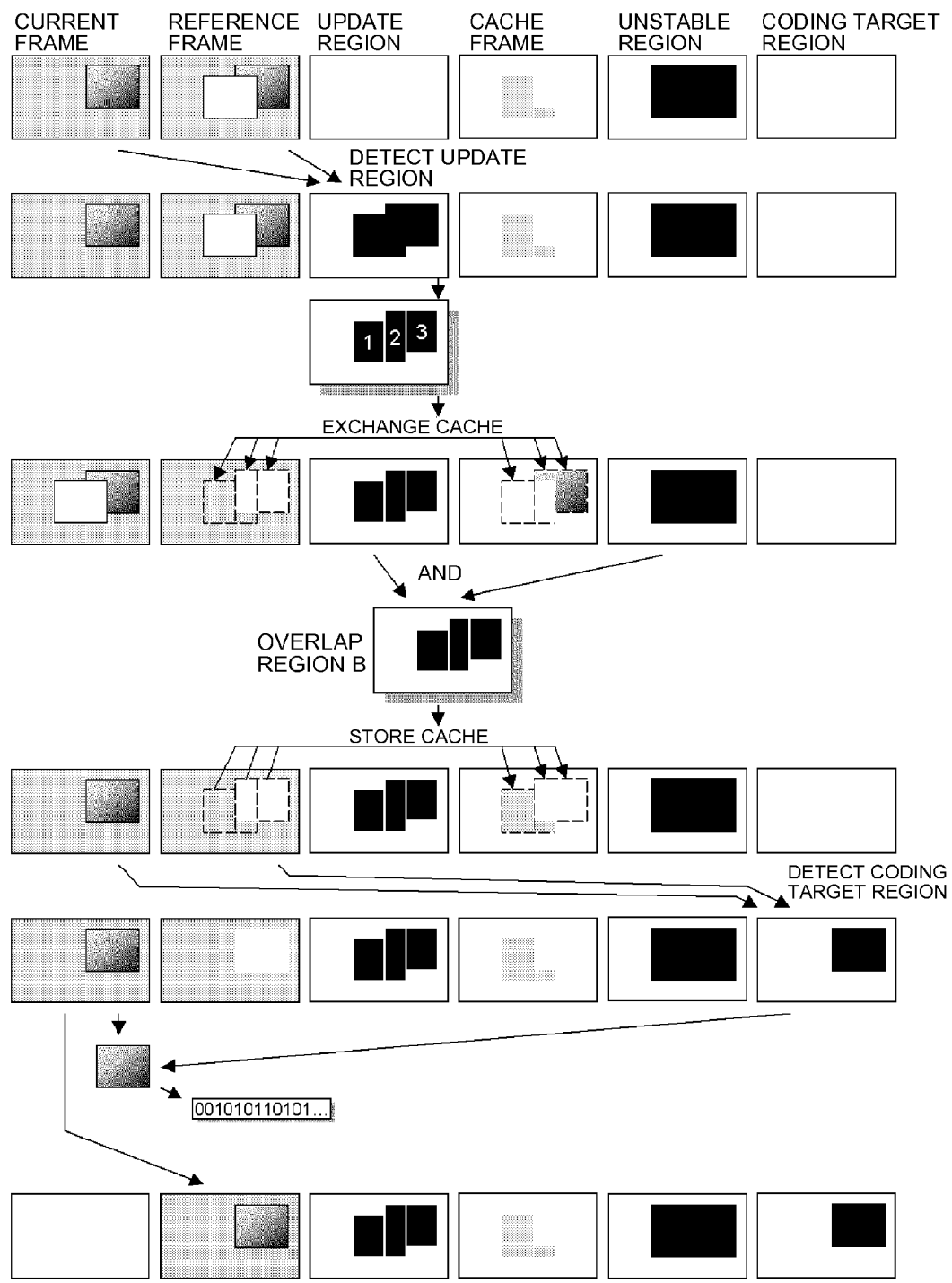
FIG. 10 is a diagram schematically showing an operation of the second exemplary embodiment of the present invention.

FIG. 10 schematically shows an operation of coding a current frame at a moment that the second moving image window is closed and the screen is returned to the original state that only the first moving image window is opened again.

When the current frame is inputted (step S201), the unstable region detection unit 3011 retrieves information of a past update region from the update region memory 41, detects one rectangular region including all recently updated regions as an unstable region, and stores information showing the region into the unstable region memory 431 (step S202). At the moment that the second moving image window is closed and the screen is returned to the original state that only the first moving image window is opened again, the unstable region is a rectangular region including the first and second moving image windows.

Next, the update region detection unit 3021 compares the current frame with a reference frame, detects a region of the first and second moving image windows as a region having been updated within the frame, stores information of the region into the update region memory 41, and notifies the cache exchange unit 3041 of the information (step S203). Herein, the update region detection unit 3021 shows a set of update pixels of each frame by approximating the set by one rectangle or a set of rectangles. At this moment, update rectangles are determined so that all of the update pixels of each frame are included in any of the update rectangles of the frame. In FIG. 10, the set of the update pixels is expressed as a set of three rectangles.

Next, the cache exchange unit 3041 exchanges the value of a pixel included in the region of the first and second moving image windows between the reference frame memory 22 and the cache frame memory 23 (step S204). Consequently, the pixel value in the initial state stored in the cache frame is stored in the first moving image window region in the reference frame memory 22, and the pixel value of the background screen stored in the cache frame is stored in a region of the second moving image window that does not overlap the first moving image window in the reference frame memory 22. Moreover, the pixel value of the first and second moving image windows is stored in a region corresponding to the first and second moving image windows in the cache frame memory 23. Moreover, the cache exchange information coding unit 305 codes information of the region that the pixel value has been exchanged by the cache exchange unit 304, and outputs to the code output device 5 (step S205).

Next, the unstable update region detection unit 3061 obtains the region of the first and second moving image windows as an overlap region B between the update region of the current frame retrieved from the update region memory 41 and the unstable region retrieved from the unstable region memory 431, and notifies the cache storage unit 3071 of the obtained region as an unstable update region (step S206). The cache storage unit 3071 copies the value of a pixel included in the unstable update region from the reference frame memory 22 to the cache frame memory 23 (step S207). Consequently, the pixel value of the region corresponding to the first moving image window region in the cache frame is returned to the pixel value of the initial state. Moreover, the cache storage information coding unit 3081 codes information of the region that the pixel value has been stored by the cache storage unit 3071, and outputs to the code output device 5 (step S208).

Next, the coding target region detection unit 309 compares the current frame retrieved from the current frame memory 21 with the reference frame retrieved from the reference frame memory 22, detects the region of the first and second moving image windows as a region having been updated within the frame, and outputs information of the region to the coding target region memory 42 (step S209).

Next, the image information coding unit 310 retrieves the value of a pixel included in the first and second moving image windows from the current frame memory 21, codes as an image, and outputs to the code output device 5 (step S210).

Finally, for the purpose of subsequently processing a following frame, the current frame becomes a new reference frame (step S211).

Thus, at the moment that the second moving image window is closed and the screen is returned to the original state that only the first moving image window is opened again, an image part of the first window is coded and outputted to the code output device 5.

Next, an effect of this exemplary embodiment will be described.

In this exemplary embodiment, after a pixel of an entire update region is exchanged between a reference frame and a cache frame, a pixel of an unstable update region (a region having been updated most recently and updated this time) is copied from the reference frame to the cache frame. Thus, only the exchange process is executed in a stable update region, with the result that an equivalent state to that in the first exemplary embodiment is achieved.

Further, in an unstable update region, the storage process is executed after the exchange process. As a result, an equivalent state to that in the case of performing only cache reference as in the first exemplary embodiment is achieved.

Therefore, as in the first exemplary embodiment, it is possible to preferentially retain a region that is likely to be redrawn, such as a background screen of a computer, as a cache.

That is to say, a combination of the cache exchange unit 304 and the cache reference unit 307 in the first exemplary embodiment and a combination of the cache exchange unit 3041 and the cache storage unit 3071 in the second exemplary embodiment realize the same function on the point that: both the combinations replace an image of an update region within a reference frame with a corresponding image in a cache frame, and store an image of a region in which a pixel value has not changed for a predetermined past period within the update region in the reference frame before the replacement, into the cache frame as an image of a stable region.

Further, in this exemplary embodiment, a simple method for detecting an unstable region is used: obtain one rectangular region including all update regions in a predetermined number of the latest frames, and consider the obtained region as an unstable region. Since this detection method makes it possible to detect an unstable region only by obtaining the maximum values/minimum values of the coordinates of the upper, lower, right and left edges of the update regions, it is possible to minimize the memory capacity and the amount of processing required for storing the shape of the unstable region.

Further, in this exemplary embodiment, an update region and an unstable region are each detected in the form of a rectangle, so that it is possible to easily obtain an overlap region only by comparing the coordinates of the upper, lower, right and left edges.

Further, in this exemplary embodiment, it is possible to largely reduce the coding amount at the time of coding information of each region. This is because all regions to be coded in this exemplary embodiment are rectangular and therefore can be expressed only by the coordinates of the upper, lower, right and left edges.

In this exemplary embodiment, an update region and an unstable region are approximated by a rectangle when processed, so that the accuracy of a region to be stored/referred to as a cache slightly decreases. In reality, however, because a computer screen is usually updated in units of rectangles and regions updated in a short period are generally very close to each other spatially, it is possible to achieve accuracy without practical issue even if a rectangle is used as an alternative.

Next, a third exemplary embodiment of the present invention will be described in detail with reference to the drawings.

Figure 11:
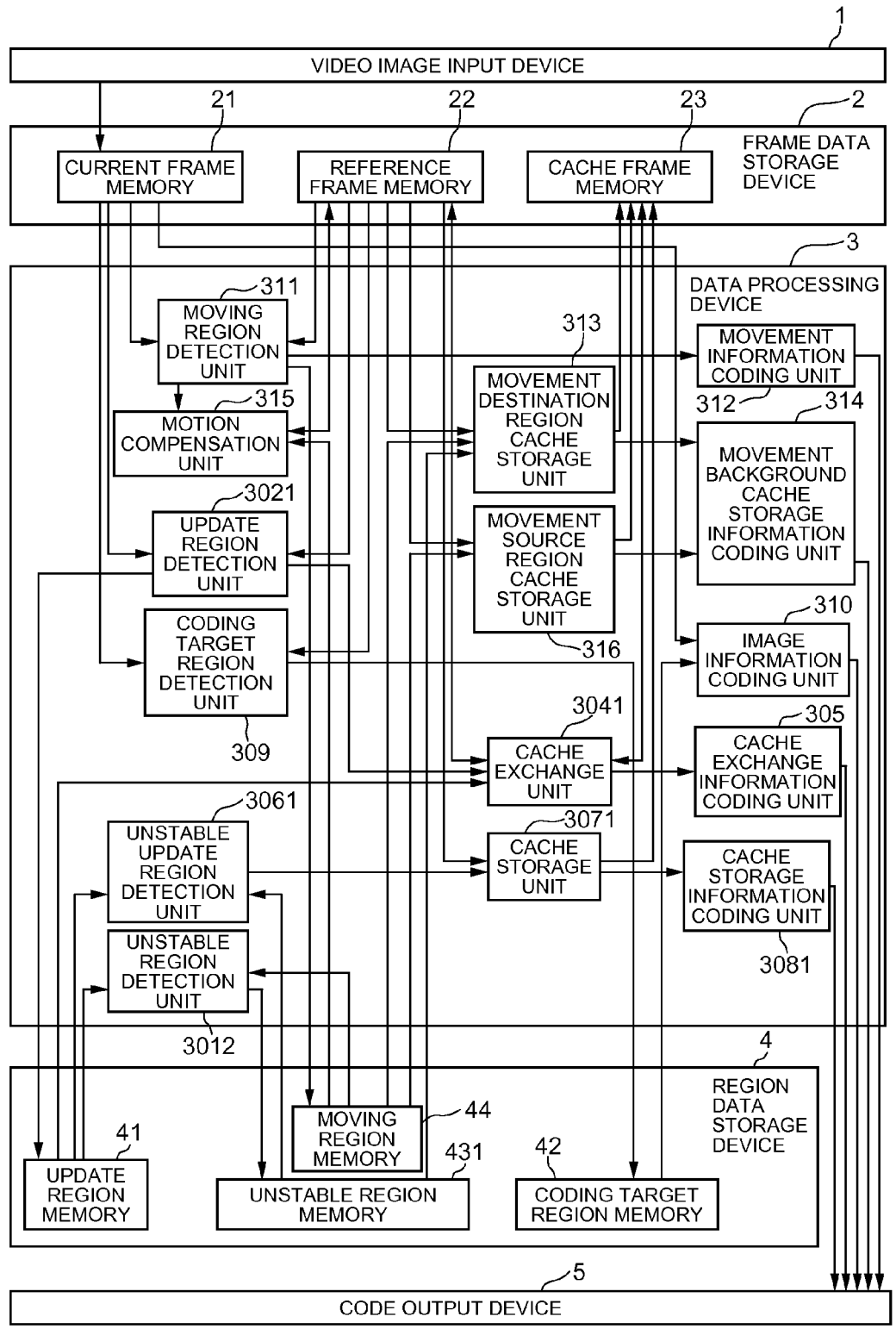
FIG. 11 is a block diagram showing a schematic configuration of a coding device according to a third exemplary embodiment of the present invention.

With reference to FIG. 11, the third exemplary embodiment of the present invention is configured by: joining a moving region detection unit 311, a movement information coding unit 312, a movement destination region cache storage unit 313, a movement background cache storage information coding unit 314, a motion compensation unit 315 and a movement source region cache storage unit 316 into the data processing device 3 of the second exemplary embodiment; joining a moving region memory 44 into the region data storage device 4 of the second exemplary embodiment; and replacing the unstable region detection unit 3011 with an unstable region detection unit 3012.

These units generally operate in the following manner, respectively.

The moving region memory 44 stores data on a moving region, which will be described later, in a predetermined number of past frames.

The unstable region detection unit 3012 retrieves information of a past update region from the update region memory 41 and information of a past moving region from the moving region memory 44, respectively. Moreover, the unstable region detection unit 3012 detects a region having been recently moved or updated as an unstable region, and stores information showing the region into the unstable region memory 431. In this exemplary embodiment, an unstable region is detected by a simple method: obtain one rectangular region including all update regions and movement destination regions in a predetermined number of the latest frames, and consider the obtained region as an unstable region.

The moving region detection unit 311 retrieves an image of a current frame from the current frame memory 21, retrieves an image of a reference frame from the reference frame memory 22, and compares the images. Thus, the moving region detection unit 311 detects a region which includes an identical or similar image existing in both the reference frame and the current frame and whose position on the frame has changed, as a moving region. The moving region detection unit 311 stores information of the moving region into the moving region memory 44, and notifies the movement information coding unit 312 and the motion compensation unit 315 of the information. In this exemplary embodiment, a moving region is detected in the form of a rectangle (a circumscribing rectangle of the moving region), and information of the moving region is expressed by the upper, lower, right and left edges of a rectangle of a movement source and the upper, lower, right and left edges of a rectangle of a movement destination.

The movement information coding unit 312 codes the information of the moving region detected by the moving region detection unit 311, and outputs to the code output device 5.

The movement destination region cache storage unit 313 retrieves the information of the moving region from the moving region memory 44, retrieves the information of the unstable region from the unstable region memory 431, and obtains a region C by excluding the unstable region from the movement destination region.

The movement destination region cache storage unit 313 copies the value of a pixel included in the region C from the reference frame memory 22 to the cache frame memory 23. That is to say, regarding certain coordinates within the region C, the movement destination region cache storage unit 313 writes a pixel value stored in the reference frame memory 22 into the same coordinates of the cache frame memory 23. Next, the movement destination region cache storage unit 313 notifies the movement background cache storage information coding unit 314 of information of the region that the pixel value has been stored.

The movement source region cache storage unit 316 retrieves the information of the moving region from the moving region memory 44, and obtains a region D by excluding the movement destination region from the movement source region.

The movement source region cache storage unit 316 copies the value of a pixel included in the region D from the current frame memory 21 to the cache frame memory 23. That is to say, regarding certain coordinates within the region D, the movement source region cache storage unit 316 writes a pixel value stored in the reference frame memory 22 into the same coordinates of the cache frame memory 23. Next, the movement source region cache storage unit 316 notifies the movement background cache storage information coding unit 314 of information of the region that the pixel value has been stored.

The movement background cache storage information coding unit 314 codes the information of the region that the pixel value has been stored by the movement destination region cache storage unit 313 or the movement source region cache storage unit 316, and outputs to the code output device 5.

The motion compensation unit 315 executes a motion compensation process on the reference frame memory 22 based on the information of the moving region notified by the moving region detection unit 311. To be specific, the motion compensation unit 315 copies the value of a pixel within the movement source region to a corresponding pixel within the movement destination region.

Figure 12:
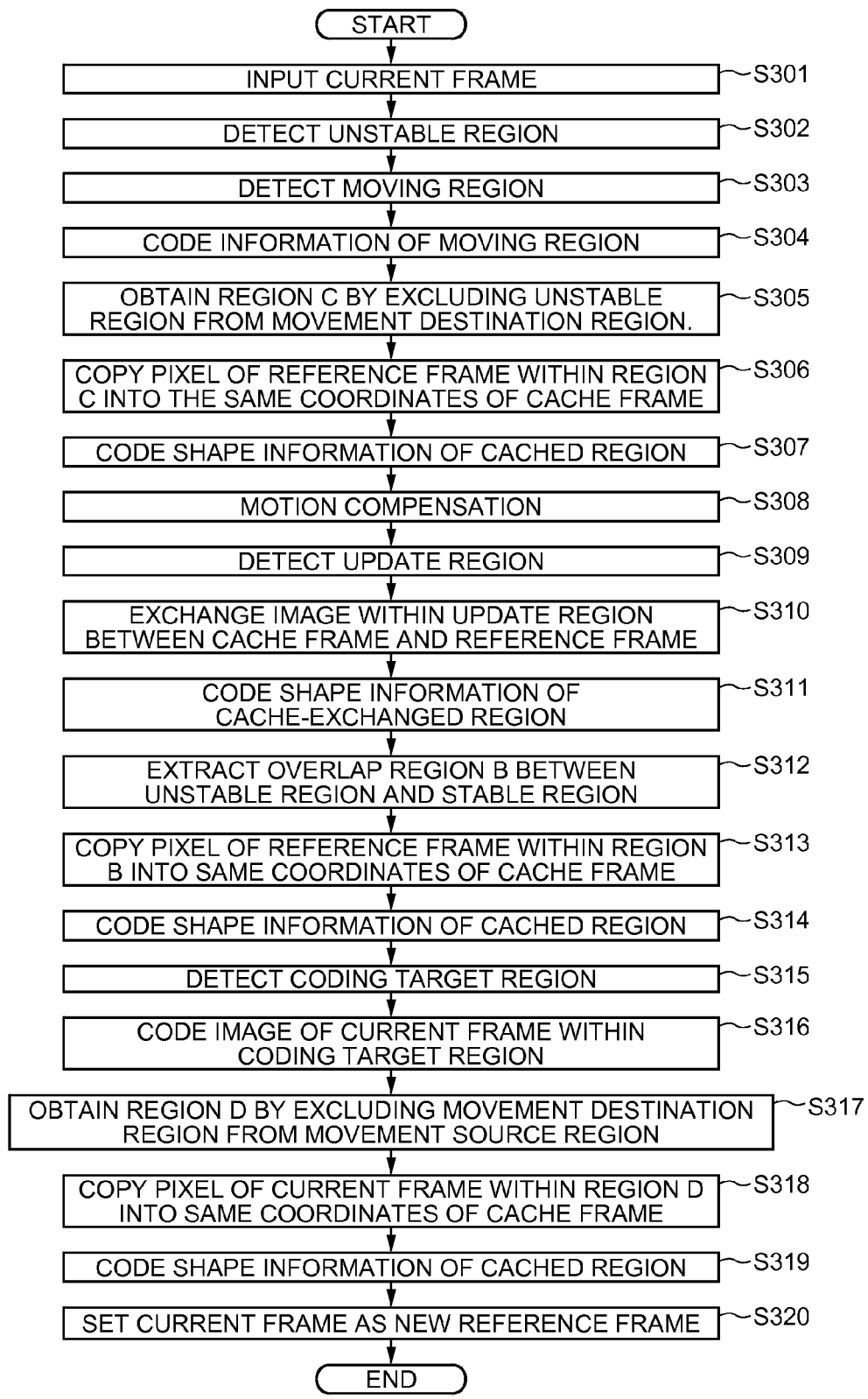
FIG. 12 is a flowchart showing a flow of a process according to the third exemplary embodiment of the present invention.

Next, with reference to FIG. 11 and a flowchart of FIG. 12, an operation of this exemplary embodiment as a whole will be described in detail.

At first, a frame of a video image to be coded is read into the current frame memory 21 by the video image input device 1 (step S301).

Next, the unstable region detection unit 3012 retrieves information of a past update region from the update region memory 41 and retrieves information of a past moving region from the moving region memory 44. Moreover, the unstable region detection unit 3012 detects a region having been recently moved or updated as an unstable region, and stores information showing the region into the unstable region memory 431. In this exemplary embodiment, an unstable region is detected by a simple method: obtain one rectangular region including all update regions and movement destination regions in a predetermined number of the latest frames, and consider the obtained region as an unstable region (step S302).

Next, the moving region detection unit 311 retrieves an image of a current frame from the current frame memory 21, retrieves an image of a reference frame from the reference frame memory 22, and compares the images. Thus, the moving region detection unit 311 detects a region which includes an identical or similar image existing in both the reference frame and the current frame and whose position on the frame has changed, as a moving region. The moving region detection unit 311 stores information of the moving region into the moving region memory 44, and notifies the movement information coding unit 312 and the motion compensation unit 315 of the information. In this exemplary embodiment, a moving region is detected in the form of a rectangle, and information of the moving region is expressed by the upper, lower, right and left edges of a rectangle of a movement source and the upper, lower, right and left edges of a rectangle of a movement destination (step S303).

Next, the movement information coding unit 312 codes the information of the moving region detected by the moving region detection unit 311, and outputs to the code output device 5 (step S304).

Next, the movement destination region cache storage unit 313 retrieves the information of the moving region from the moving region memory 44, retrieves the information of the unstable region from the unstable region memory 431, and obtains a region C by excluding the unstable region from the movement destination region (step S305).

Next, the movement destination region cache storage unit 313 copies the value of a pixel included in the region C from the reference frame memory 22 to the cache frame memory 23. That is to say, regarding certain coordinates within the region C, the movement destination region cache storage unit 313 writes a pixel value stored in the reference frame memory 22 into the same coordinates of the cache frame memory 23. Next, the movement destination region cache storage unit 313 notifies the movement background cache storage information coding unit 314 of information of the region that the pixel value has been stored (step S306).

In this exemplary embodiment, since motion compensation is performed, there is a case that a movement destination region is not detected as an update region. Therefore, a region C obtained by excluding an unstable region from a movement destination region, i.e., a stable region in a movement destination region is exempt from cache exchange by the cache exchange unit 3041. Therefore, by executing the processes of steps S305 and S306, a pixel value included in the region C obtained by eliminating the unstable region from the movement destination region is retracted from the reference frame memory 22 to the cache frame memory 23 at this moment.

Next, the movement background cache storage information coding unit 314 codes the information of the region that the pixel value has been stored by the movement destination region cache storage unit 313, and outputs to the code output device 5 (step S307).

Next, the motion compensation unit 315 executes a motion compensation process on the reference frame memory 22 based on the information of the moving region that the moving region detection unit 311 has notified. To be specific, on the reference frame memory 22, the motion compensation unit 315 copies the value of a pixel within the movement source region to a corresponding pixel within the movement destination region (step S308).

Steps S309 to S316 are similar to steps S203 to S210 of the second exemplary embodiment.

Next, the movement source region cache storage unit 316 retrieves the information of the moving region from the moving region memory 44, and obtains a region D by excluding the movement destination region from the movement source region (step S317).

Next, the movement source region cache storage unit 316 copies the value of a pixel included in the region D from the current frame memory 21 to the cache frame memory 23. That is to say, regarding certain coordinates within the region D, the movement source region cache storage unit 316 writes a pixel value stored in the reference frame memory 22 into the same coordinates of the cache frame memory 23. Next, the movement source region cache storage unit 316 notifies the movement background cache storage information coding unit 314 of information of the region that the pixel value has been stored (step S318).

Next, the movement background cache storage information coding unit 314 codes the information of the region that the pixel value has been stored by the movement source region cache storage unit 316, and outputs to the code output device 5 (step S319).

Finally, in the case of subsequently processing a following frame, the current frame becomes a new reference frame (step S320).

Next, taking coding of a computer screen as an example, the operation of this exemplary embodiment will be described more specifically.

Figure 13:
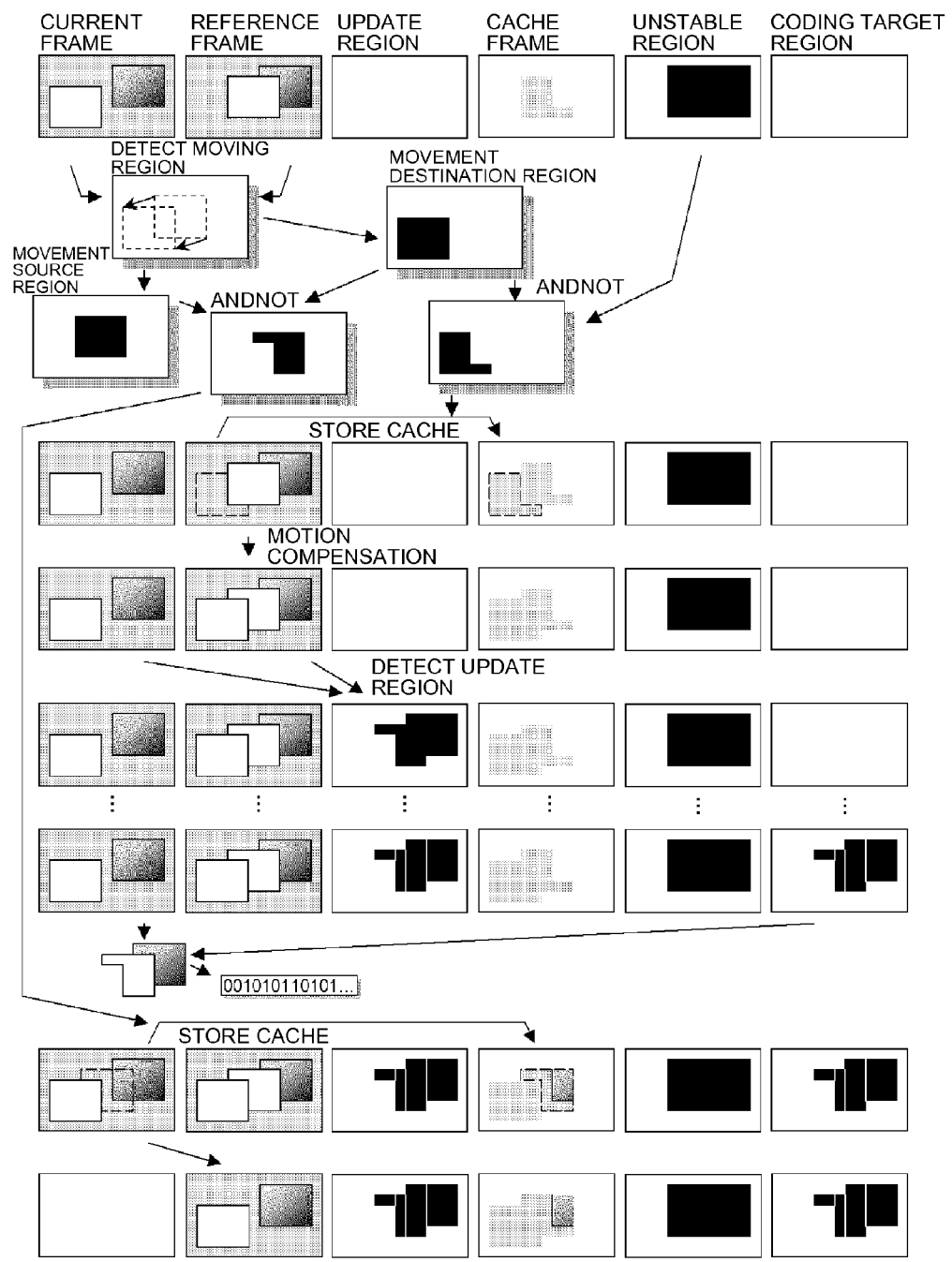
FIG. 13 is a diagram schematically showing an operation of the third exemplary embodiment of the present invention.

As a specific example, an example of coding a video image on a computer screen in the case of, in a state that a moving image window and a still image window are opened on a background screen so that the still image window partially overlaps the moving image window as shown by a reference frame on the top line in FIG. 13, moving only the still image window as shown by a current frame on the top line will be considered. It is assumed that a pixel of a background screen part behind a region that does not overlap the moving image window in a region of the still image window is stored in a cache frame. It is assumed that the still image window has been opened immediately before a moment of FIG. 13 and much time has not passed after the still image has been drawn.

When the current frame is inputted (step S301), the unstable region detection unit 3012 retrieves information of a past update region from the update region memory 41, retrieves information of a past moving region from the moving region memory 44, detects one rectangular region including all of recently update regions and recently moved regions, as an unstable region, and stores information showing the region into the unstable region memory 431 (step S302). In a case that the moving image window and the still image window are displayed on the background screen so as to overlap, a part corresponding to the moving image window and the still image window is unstable as shown in FIG. 13. In the drawing, the unstable region is shown in black color, and a stable region is shown in while color.

Next, the moving region detection unit 311 compares the current frame with the reference frame and detects a region of the still image window as a moving region (step S303), and the movement information coding unit 312 codes and outputs information of the detected moving region (step S304).

Next, the movement destination region cache storage unit 313 obtains a region C by excluding the unstable region from a movement destination region of the still image window (step S305), and copies a pixel of the reference frame within the region C to the cache frame (step S306). Moreover, the movement background cache storage information coding unit 314 codes and outputs information of the cached region C (step S307).

Next, on the reference frame memory 22, the motion compensation unit 315 copies the value of a pixel within a movement source region of the still image window to a corresponding pixel within the movement destination region (step S308).

After that, by the update region detection unit 3021, the cache exchange unit 3041, the cache exchange information coding unit 305, the unstable update region detection unit 3061, the cache storage unit 3071, the cache storage information coding unit 3081, the coding target region detection unit 309 and the image information coding unit 310, similar processes to those of the second exemplary embodiment are executed. As a result, the moving image window and a region obtained by excluding the movement destination region from the movement source region of the still image window are coded as a coding target region.

Next, the movement source region cache storage unit 316 retrieves the information of the moving region from the moving region memory 44, and obtains a region D by excluding the movement destination region from the movement source region (step S317). Next, the movement source region cache storage unit 316 copies the value of a pixel included in the region D from the current frame memory 21 to the cache frame memory 23 (step S318). Moreover, the movement background cache storage information coding unit 314 codes information of the region that the pixel value has been stored by the movement source region cache storage unit 316 and outputs to the code output device 5 (step S319).

Finally, for the purpose of subsequently processing a following frame, the current frame becomes a new reference frame (step S320).

Next, an effect of this exemplary embodiment will be described.

In this exemplary embodiment, immediately before motion compensation is performed, a region obtained by excluding an unstable region from a movement source region, i.e., a region that is hidden by motion compensation and has not been updated recently is stored into a cache.

Consequently, even if a window or the like is moved and the background of the window is thereby hidden, it is possible to store the hidden background into the cache.

Further, in this exemplary embodiment, after the motion compensation and coding of an image are finished, a region obtained by excluding a movement destination region from the movement source region is stored into the cache.

Consequently, in a case that the window or the like is moved and the background having been hidden appears thereby, it is possible to regard the region as the background and store the region into the cache early. In the absence of this process, for example, when a window is moved in a reciprocated manner at high speeds, the background of the window is not determined as a stable region, so that there is a problem that the background is never cached. By early storing a region obtained by excluding a movement destination from a movement source into a cache, it is possible to increase the cache hit ratio.

Although this exemplary embodiment is configured by including motion compensation into the second exemplary embodiment, it is also possible to configure an exemplary embodiment by including motion compensation into the first exemplary embodiment.

Further, the function of the moving image coding device of the present invention can be realized by hardware, and can also be realized by a computer and a program. The program is provided in the recorded state on a computer-readable recording medium such as a magnetic disk and a semiconductor memory, and is read by the computer when the computer is started. The program controls the operation of the computer, thereby causing the computer to function as the moving image coding device of each of the exemplary embodiments described above.

Although the present invention has been explained above with reference to the respective exemplary embodiments, the present invention is not limited to the exemplary embodiments described above. The configuration and details of the present invention can be altered in various manners that can be understood by those skilled in the art within the scope of the present invention.

The present invention is based upon and claims the benefit of priority from Japanese patent application No. 2009-191616, filed on Aug. 21, 2009, the disclosure of which is incorporated herein in its entirety by reference.

Industrial Applicability

The present invention can be used for the purpose of effectively decreasing the coding amount occurring at the time of redrawing in screen transmission in a thin client and the like.

DESCRIPTION OF NUMERALS 1 video image input device
2 frame data storage device
3 data processing device
4 region data storage device
5 code output device
21 current frame memory
22 reference frame memory
23 cache frame memory
41 update region memory
42 coding target region memory
43 stable region memory
44 moving region memory
301 stable region detection unit
302 update region detection unit
303 stable update region detection unit
304 cache exchange unit
305 cache exchange information coding unit
306 unstable update region detection unit
307 cache reference unit
308 cache reference information coding unit
309 coding target region detection unit
310 image information coding unit
311 moving region detection unit
312 movement information coding unit
313 movement destination region cache storage unit
314 movement background cache storage information coding unit
315 compensation unit
316 movement source region cache storage unit
431 unstable region memory
3011 unstable region detection unit
3012 unstable region detection unit
3021 update region detection unit
3041 cache exchange unit
3061 unstable update region detection unit
3071 cache storage unit
3081 cache storage information coding unit

The invention claimed is:

1. A moving image coding device, comprising:
a reference frame memory configured to store a reference frame;
a current frame memory configured to store a current frame;
a cache frame memory configured to store a cache frame;
an update region memory configured to store data relating to an updated region in a predetermined number of past frames;
an unstable region memory configured to store information showing an updated region that has been updated within any frame in a predetermined number of past frames;
a coding target region memory configured to store information showing a region to be coded in the current frame;
an unstable region detection unit implemented by at least a processor that, when a frame of a video image to be coded is stored into the current frame, detects a region that has been updated within any frame in a predetermined number of past frames as an unstable region based on data being stored in the update region memory, and stores information showing the unstable region into the unstable region memory;
an update region detection unit implemented by at least a processor and that compares the reference frame and the current frame, detects a region in which a pixel value has changed, as an update region of the current frame, and stores the detected update region into the update region memory;
a cache exchange unit implemented by at a least a processor that exchanges a pixel value included in the update region of the current frame between the reference frame and the cache frame;
a cache exchange information coding unit implemented by at a least a processor and that codes information of a region in which a pixel value has been exchanged by the cache exchange unit;
an unstable update region detection unit implemented by at least a processor and that detects an overlap region between the unstable region and the updated region of the current frame as an unstable update region;
a cache storage unit implemented by at least a processor and that stores a pixel value of the unstable update region of the reference frame into the cache frame;
a cache storage information coding unit implemented by at least a processor that codes information of a region in which a pixel value has been stored from the reference frame into the cache frame by the cache storage unit;
a coding target region detection unit implemented by at a least a processor and that compares the reference frame being processed by the cache exchange unit with the current frame, detects a region in which a pixel value has changed as a coding target region, and stores information of the coding target region into the coding target region memory; and
an image information coding unit implemented by at least a processor that codes an image of the coding target region of the current frame.

2. The moving image coding device according to claim 1, the method implemented by the moving image coding device including a moving region memory further comprising:
  a moving region detection unit implemented by at least a processor and that compares the reference frame and the current frame, and detects a moving region, and stores information showing the moving region into the moving region memory;
  a movement destination region cache storage unit implemented by at least a processor and that stores an image of a region in which a pixel value has not changed for a predetermined past period in a region corresponding to a movement destination region of the moving region in the reference frame, into the cache frame as an image of a stable region;
  a motion compensation unit implemented by at least a processor and, regarding the moving region, that performs copying from a movement source to a movement destination on the reference frame;
  a movement information coding unit implemented by at least a processor that codes information of the moving region detected by the moving region detection unit; and
  a movement background cache storage information coding unit implemented by at least a processor that codes information of the region that the image has been stored into the cache frame by the movement destination region cache storage unit.

3. The moving image coding device according to claim 2, comprising:
  a movement source region cache storage unit implemented by at least a processor, regarding the moving region, that stores an image of a region obtained by excluding a movement destination region from a movement source region in the current frame, into the cache frame,
  wherein the movement background cache storage information coding unit codes information of the region that the image has been stored into the cache frame by the movement source region cache storage unit.

4. The moving image coding device according to claim 1, configured to perform processing by approximating a region by one or more rectangles.

5. A moving image coding device comprising
  a reference frame memory configured to store a reference frame;
  a current frame memory configured to store a current frame;
  a cache frame memory configured to store a cache frame;
  an update region memory configured to store data relating to an updated region in a predetermined number of past frames;
  a stable region memory configured to store information showing a region that has not been updated at all in a predetermined number of past frames;
  a coding target region memory configured to store information showing a region to be coded in the current frame;
  a stable region detection unit implemented by at least a processor that, when a frame of a video image to be coded is stored into the current frame, detects a region that has not been updated at all within any frame in a predetermined number of past frames as an stable region based on data being stored in the update region memory, and stores information showing the stable region into the stable region memory;
  an update region detection unit implemented by at least a processor and that compares the reference frame and the current frame, detects a region in which a pixel value has changed, as an update region of the current frame, and stores the detected update region into the update region memory;
  a stable update region detection unit implemented by at a least a processor that detects an overlap region between the updated region of the current frame and the stable region as a stable update region;
  a cache exchange unit implemented by at least a processor that exchanges a pixel value included in the stable update region between the reference frame and the cache frame;
  a cache exchange information coding unit implemented by at a least a processor and that codes information of a region in which a pixel value has been exchanged by the cache exchange unit;
  an unstable update region detection unit implemented by at a least a processor that detects a region being not included in the stable region within the frame, and detects an overlap region between the region within the frame and the updated region of the current frame as an unstable update region;
  a cache reference unit implemented by at least a processor that stores a pixel value of the unstable update region within the cache frame into the reference memory;
  a cache reference information coding unit implemented by at a least a processor that codes information of a region in which a pixel value is stored from the cache frame into the reference frame by the cache reference unit;
  a coding target region detection unit implemented by at a least a processor and that compares the reference frame being processed by the cache exchange unit and the cache reference unit with the current frame, detects a region in which a pixel value has changed as a coding target region, and stores information of the coding target region into the coding target region memory; and
  an image information coding unit implemented by at least a processor and that codes an image of the coding target region of the current frame.

6. A moving image coding method implemented by a moving image coding device including a reference frame memory configured to store a reference frame;
  a current frame memory configured to store a current frame;
  a cache frame memory configured to store a cache frame;
  an update region memory configured to store data relating to an updated region in a predetermined number of past frames;
  an unstable region memory configured to store information showing an updated region that has been updated within any frame in a predetermined number of past frames;
  a coding target region memory configured to store information showing a region to be coded in the current frame, the method comprising;
  detecting, when a frame of a video image to be coded is stored into the current frame, a region that has been updated within any frame in a predetermined number of past frame as an unstable region based on data being stored in the update region memory, and storing information showing the unstable region into the unstable region memory;
  comparing the reference frame and the current frame, detecting a region in which a pixel value has changed, as an update region of the current frame, and storing the detected update region into the update region memory;
  exchanging a pixel value included in the update region of the current frame between the reference frame and the cache frame;

coding information of a region in which a pixel value has been exchanged;

detecting an overlap region between the unstable region and the updated region of the current frame as an unstable update region;

storing a pixel value of the unstable update region of the reference frame into the cache frame;

coding information of a region in which a pixel value has been stored from the reference frame into the cache;

comparing the reference frame being processed by the exchange with the current frame, detecting a region in which a pixel value has changed as a coding target region, and storing information of the coding target region into the coding target region memory; and coding an image of the coding target region of the current frame.

7. The moving image coding method according to claim 6, the method implemented by the moving image coding device including a moving region memory further comprising, before detecting the update region:

comparing the reference frame and the current frame to detect a moving region, storing information showing the moving region into the moving region memory;

storing an image of a region in which a pixel value has not changed for a predetermined past period in a region corresponding to a movement destination region of the moving region in the reference frame, into the cache frame as an image of a stable region, and, regarding the moving region, performing copying from a movement source to a movement destination on the reference frame, and coding information of a region obtained by excluding a movement destination region from a movement source region in the current frame.

8. The moving image coding method according to claim 7, comprising:

regarding the moving region, storing an image of a region obtained by excluding a movement destination region from a movement source region in the current frame, into the cache frame, and coding information of the region obtained by excluding the movement destination region from the movement source region in the current frame.

9. The moving image coding method according to claim 6, further comprising performing processing by approximating a region by one or more rectangles.

10. A moving image coding method
implemented by a moving image coding device including a reference frame memory configured to store a reference frame;

a current frame memory configured to store a current frame;

a cache frame memory configured to store a cache frame;

an update region memory configured to store data relating to an updated region in a predetermined number of past frames;

a stable region memory configured to store information showing a region that has not been updated at all in a predetermined number of past frames;

a coding target region memory configured to store information showing a region to be coded in a current frame, the method comprising:

detecting, when a frame of a video image to be coded is stored into the current frame, a region that has not been updated at all within any frame in a predetermined number of past frames as an stable region based on data being stored in the update region memory, and storing information showing the stable region into the stable region memory;

comparing the reference frame and the current frame, detecting a region in which a pixel value has changed, as an update region of the current frame, and storing the detected update region into the update region memory;

detecting an overlap region between the updated region of the current frame and the stable region as an stable update region;

exchanging a pixel value included in the stable update region between the reference frame and the cache frame;

coding information of a region in which a pixel value has been exchanged by the cache exchange unit;

detecting a region being not included in the stable region within the frame, and detecting an overlap region between the region within the frame and the updated region of the current frame as an unstable update region;

storing a pixel value of the unstable update region within the cache frame into the reference memory;

coding information of a region in which a pixel value is stored from the cache frame into the reference frame;

comparing, after the stable update region of the cache frame and a pixel value of the unstable update region are stored, the reference frame with the current frame, detecting a region in which a pixel value has changed as a coding target region, and storing information of the coding target region into the coding target region memory; and coding an image of the coding target region of the current frame.

11. A non-transitory computer-readable medium that records a program comprising instructions for causing a computer provided with a reference frame memory configured to store a reference frame, a current frame memory configured to store a current frame; a cache frame memory configured to store a cache frame; an update region memory configured to store data relating to an updated region in a predetermined number of past frames; an unstable region memory configured to store information showing an updated region that has been updated within any frame in a predetermined number of past frame; and a coding target region memory configured to store information showing a region to be coded in a current frame, to function as:

an unstable region detection unit implemented by at least a processor and that, when a frame of a video image to be coded is stored into the current frame, detects a region that has been updated within any frame in a predetermined number of past frame as an unstable region based on data being stored in the update region memory, and stores information showing the unstable region into the unstable region memory;

an update region detection unit implemented by at least a processor and that compares the reference frame and the current frame, and detects a region in which a pixel value has changed, as an update region of the current frame and stores the detected update region into the update region memory;

a cache exchange unit implemented by at a least a processor that exchanges a pixel value included in the update region of the current frame between the reference frame and the cache frame;

a cache exchange information coding unit implemented by at a least a processor and that codes information of a region in which a pixel value has been exchanged by the cache exchange unit;

an unstable update region detection unit implemented by at least a processor and that detects an overlap region between the unstable region and the updated region of the current frame as an unstable update region;

a cache storage unit implemented by at least a processor and that stores a pixel value of the unstable update region of the reference frame into the cache frame;

a cache storage information coding unit implemented by at least a processor that codes information of a region in which a pixel value has been stored from the reference frame into the cache frame by the cache storage unit;

a coding target region detection unit implemented by at a least a processor and that compares the reference frame being processed by the cache exchange unit with the current frame, detects a region in which a pixel value has changed as a coding target region, and stores information of the coding target region into the coding target region memory; and an image information coding unit implemented by at least a processor that codes an image of the coding target region of the current frame.

12. The non-transitory computer-readable recording medium that records the program according to claim 11, further comprising instructions for causing the computer including a moving region memory to function as:

a moving region detection unit implemented by at least a processor and that compares the reference frame and the current frame, detects a moving region, and stores information showing the moving region in the moving region memory;

a movement destination region cache storage unit implemented by at least a processor and that stores an image of a region in which a pixel value has not changed for a predetermined past period in a region corresponding to a movement destination region of the moving region in the reference frame, into the cache frame as an image of a stable region; and a motion compensation unit implemented by at least a processor and, regarding the moving region, that performs copying from a movement source to a movement destination on the reference frame;

a movement information coding unit implemented by at a least a processor and that codes information of the moving region detected by the moving region detection unit, and information of the region that the image has been stored into the cache frame by the movement destination region cache storage unit.

13. The non-transitory computer-readable recording medium that records the program according to claim 12, further comprising instructions for causing the computer to function as:

a movement source region cache storage unit implemented by at least a processor and, regarding the moving region, store an image of a region obtained by excluding a movement destination region from a movement source region in the current frame, into the cache frame, wherein the movement background cache storage information coding unit further codes information of the region that the image has been stored into the cache frame by the movement source region cache storage unit.

14. A non-transitory computer readable medium that records a program comprising instructions for causing a computer including a reference frame memory configured to store a reference frame; a current frame memory configured to store a current frame; a cache frame memory configured to store a cache frame; an update region memory configured to store data relating to an updated region in a predetermined number of past frames; a stable region memory configured to store information showing a region that has not been updated at all in a predetermined number of past frames; a coding target region memory configured to store information showing a region to be coded in the current frame; to function as:

a stable region detection unit implemented by at least a processor that, when a frame of a video image to be coded is stored into the current frame, detects a region that has not been updated at all within any frame in a predetermined number of past frames as an stable region based on data being stored in the update region memory, and stores information showing the stable region into the stable region memory;

an stable update region detection unit implemented by at least a processor and that compares the reference frame and the current frame, detect a region in which a pixel value has changed, as an update region of the current frame, and stores the detected update region into the update region memory;

a stable update region detection unit implemented by at a least a processor that detects an overlap region between the updated region of the current frame and the stable region as an stable update region;

a cache exchange unit implemented by at least a processor that exchanges a pixel value included in the stable update region between the reference frame and the cache frame;

a cache exchange information coding unit implemented by at a least a processor and that codes information of a region in which a pixel value has been exchanged by the cache exchange unit;

an unstable update region detection unit implemented by at a least a processor that detects a region being not included in the stable region within the frame, and detects an overlap region between the region within the frame and the updated region of the current frame as an unstable update region;

a cache reference unit implemented by at a least a processor that stores a pixel value of the unstable update region within the cache frame into the reference memory;

a cache reference information coding unit implemented by at a least a processor that codes information of a region in which a pixel value is stored from the cache frame into the reference frame by the cache reference unit;

a coding target region detection unit implemented by at a least a processor and that compares the reference frame being processed by the cache exchange unit with the current frame, detects a region in which a pixel value has changed as a coding target region, and stores information of the coding target region into the coding target region memory; and an image information coding unit implemented by at least a processor and that codes an image of the coding target region of the current frame.

* * * * *